(12) United States Patent
Cai et al.

(10) Patent No.: US 11,539,490 B2
(45) Date of Patent: Dec. 27, 2022

(54) SIGNAL TRANSMISSION METHOD AND RELATED DEVICE

(71) Applicant: HUAWEI TECHNOLOGIES CO., LTD., Guangdong (CN)

(72) Inventors: Yu Cai, Beijing (CN); Yongbo Zeng, Beijing (CN); Jian Wang, Beijing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 92 days.

(21) Appl. No.: 16/637,504

(22) PCT Filed: Aug. 9, 2017

(86) PCT No.: PCT/CN2017/096616
§ 371 (c)(1),
(2) Date: Feb. 7, 2020

(87) PCT Pub. No.: WO2019/028699
PCT Pub. Date: Feb. 14, 2019

(65) Prior Publication Data
US 2020/0228283 A1 Jul. 16, 2020

(51) Int. Cl.
*H04W 72/04* (2009.01)
*H04L 5/00* (2006.01)
(Continued)

(52) U.S. Cl.
CPC .......... *H04L 5/0053* (2013.01); *H04L 1/0026* (2013.01); *H04L 5/006* (2013.01);
(Continued)

(58) Field of Classification Search
None
See application file for complete search history.

(56) References Cited

U.S. PATENT DOCUMENTS

2013/0159546 A1* 6/2013 Thang ................ H04N 21/8456
709/231
2015/0009910 A1* 1/2015 Ryu ....................... H04W 72/04
370/329
(Continued)

FOREIGN PATENT DOCUMENTS

CA 103179669 A 6/2013
CA 103517371 A 1/2014
(Continued)

OTHER PUBLICATIONS

International Search Report dated Mar. 30, 2018, issued in counterpart application No. PCT/CN2017/096616, with English translation. (14 pages).

(Continued)

*Primary Examiner* — The Hy Nguyen
(74) *Attorney, Agent, or Firm* — WHDA, LLP

(57) ABSTRACT

This application discloses a signal transmission method and a related device. The method may include: sending, by a first terminal, a first message to a network device, where the first message is used to indicate a transmission mode used by the first terminal to transmit a signal; receiving a second message sent by the network device, where the second message is used to indicate a resource used by the first terminal to transmit the signal; and transmitting the signal on the resource. According to the foregoing solution, a terminal may transmit a signal by using different transmission modes and resources.

11 Claims, 9 Drawing Sheets

(51) Int. Cl.
*H04L 1/00* (2006.01)
*H04L 5/26* (2006.01)

(52) U.S. Cl.
CPC ........... *H04L 5/26* (2013.01); *H04W 72/0406* (2013.01); *H04W 72/0453* (2013.01)

(56) References Cited

U.S. PATENT DOCUMENTS

| | | | |
|---|---|---|---|
| 2015/0271657 A1 | 9/2015 | Xiong et al. | |
| 2015/0327314 A1* | 11/2015 | Liu | H04W 72/0406 370/329 |
| 2016/0044500 A1 | 2/2016 | Hole et al. | |
| 2016/0198504 A1* | 7/2016 | Seo | H04W 72/0473 370/329 |
| 2016/0262142 A1* | 9/2016 | Nagata | H04W 8/005 |
| 2017/0317740 A1* | 11/2017 | Basu Mallick | H04W 88/04 |
| 2018/0242228 A1* | 8/2018 | Jung | H04W 8/24 |
| 2019/0029029 A1* | 1/2019 | Ohtsuji | H04L 5/00 |
| 2019/0223231 A1* | 7/2019 | Muraoka | H04W 92/18 |
| 2019/0394786 A1* | 12/2019 | Parron | H04L 27/0006 |
| 2020/0128470 A1* | 4/2020 | Mok | H04W 40/14 |
| 2020/0178268 A1* | 6/2020 | Duengen | H04W 72/042 |

FOREIGN PATENT DOCUMENTS

| | | | |
|---|---|---|---|
| CA | 103841649 A | | 6/2014 |
| CN | 104335654 A | | 2/2015 |
| CN | 104811892 A | | 7/2015 |
| CN | 105453679 A | | 3/2016 |
| CN | 106059726 A | | 10/2016 |
| CN | 106464715 A | | 2/2017 |
| CN | 106878996 A | | 6/2017 |
| DE | 10 2017 212 244.7 | * | 7/2017 |
| EP | 3346780 A1 | | 7/2018 |
| WO | 2017049638 A1 | | 3/2017 |
| WO | WO-2017171897 A1 | * | 10/2017 ............ H04W 72/04 |

OTHER PUBLICATIONS

R2-1701497 Sony,"Relay and Remote device physical layer capabilities",3GPP TSG RAN WG2 Meeting #97,Athens, Greece, Feb. 13-17, 2017,total 3 pages.
Extended Search Report dated Jul. 10, 2020, issued in counterpart EP Application No. 17920659.4 (9 pages).
Huawei, MCC TF160, Catt, Update of V2X related message contents in 36.508, 3GPP TSG-RAN WG5 Meeting #75, R5-172568 , Hangzhou, China, 15 May 19, 2017 ,11 pages.
Office Action dated Jul. 27, 2021, issued in counterpart CN Application No. 201780091460.1. (8 pages).

* cited by examiner

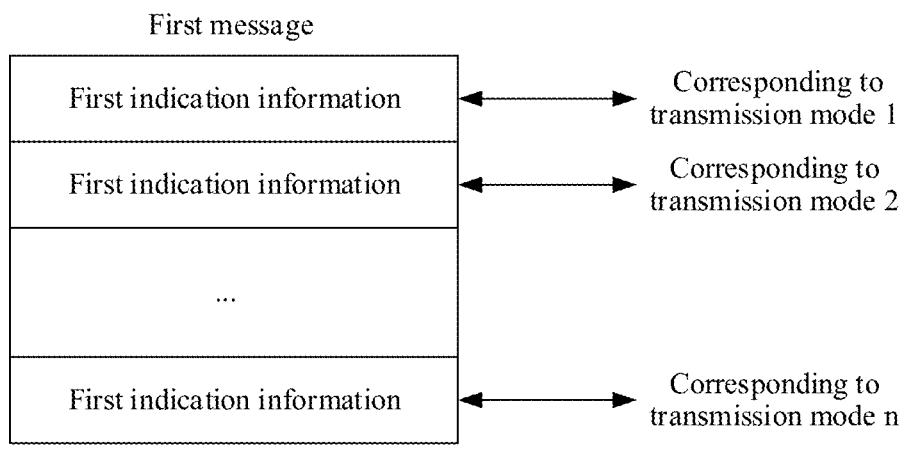
FIG. 4a
FIG. 4b
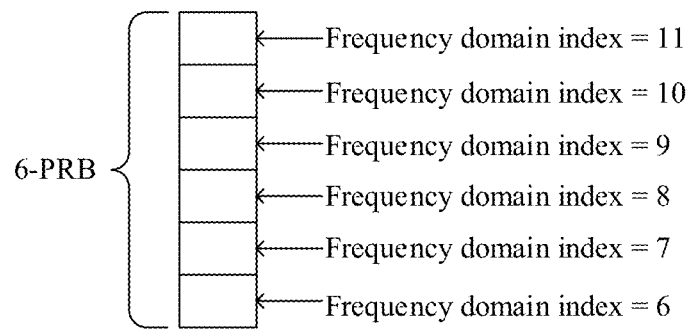
FIG. 5

SIGNAL TRANSMISSION METHOD AND RELATED DEVICE

CROSS-REFERENCE TO RELATED APPLICATIONS

This application is a national stage of International Application No. PCT/CN2017/096616, filed on Aug. 9, 2017, which is hereby incorporated by reference in its entirety.

TECHNICAL FIELD

This application relates to the field of resource allocation and signal transmission, and in particular, to a signal transmission method and a related device.

BACKGROUND

Currently, a quantity of communications terminals increases rapidly, a higher data transmission rate is required for mobile communication, and a capacity of a communications system and spectrum resources that can be used by the communications system have become major factors hindering development of mobile communication technologies.

To improve radio spectrum utilization of the communications system, cellular network—based device-to-device (D2D) communication, also referred to as proximity service (ProSe), is provided in the prior art. FIG. 1 shows a schematic diagram of a network architecture of D2D communication. As shown in the figure, two user first terminals that are close to each other directly perform D2D communication by using a wireless resource allocated by a network device instead of using a previous cellular communication mode in which forwarding is performed by using a network. The D2D communication can reduce a load on a network device side and increase a system capacity, thereby increasing wireless resource utilization in a cellular wireless communications system.

SUMMARY

This application provides a signal transmission method and a related device. When requesting, from a network device, a resource used to send information, a first terminal notifies the network device of a transmission mode of a signal, so that the network device may configure corresponding resources for the first terminal, and the first terminal may determine a target resource from the configured resources and transmit, by using the target resource, the signal in a corresponding transmission mode.

According to a first aspect, this application provides a signal transmission method, applied to a first terminal side, including: sending, by a first terminal, a first message to a network device, where the first message is used to indicate a transmission mode used by the first terminal to transmit a signal; receiving a second message sent by the network device, where the second message is used to indicate a resource used by the first terminal to transmit the signal; and transmitting the signal on the resource.

According to a second aspect, this application provides a signal transmission method, applied to a network device side, including: receiving, by a network device, a first message sent by a first terminal, where the first message is used to indicate a transmission mode used by the first terminal to transmit a signal; and sending a second message to the first terminal, where the second message is used to indicate a resource used by the first terminal to transmit the signal.

In this application, the transmission mode used when the first terminal transmits the signal is a manner of using a resource, and may be classified from the following three aspects.

1. The transmission mode is classified based on a maximum frequency domain width. The maximum frequency domain width may be determined based on a maximum frequency domain width supported when the second terminal used to receive the signal sent by the first terminal receives a sidelink signal.

In an optional embodiment, the following three transmission modes may be included.

A first transmission mode is transmitting the signal by using a resource within full bandwidth.

A second transmission mode is transmitting the signal by using a resource within a 6-PRB frequency domain width.

A third transmission mode is transmitting the signal by using a resource within a 1-PRB frequency domain width.

It may be understood that in a specific implementation, more transmission modes may be included in the first aspect, such as a manner of transmitting the signal by using a resource within a 2-PRB frequency domain width, a manner of transmitting the signal by using a resource within a 4-PRB frequency domain width, a manner of transmitting the signal by using a resource within X kHz, and the like.

2. The transmission mode is classified based on a second terminal that receives the signal.

In an optional embodiment, the following three transmission modes may be included.

A first transmission mode is transmitting the signal to a second terminal whose bandwidth capability is not limited.

A second transmission mode is transmitting the signal to a second terminal having limited bandwidth of a 6-PRB frequency domain width.

A third transmission mode is transmitting the signal to a second terminal having limited bandwidth of a 1-PRB frequency domain width.

In another optional embodiment, the following two transmission modes may be included.

A first transmission mode is transmitting the signal to a terminal used for narrow band Internet of things (NB-IoT).

A second transmission mode is transmitting the signal to a terminal used for enhanced machine type communication (eMTC).

3. The following two transmission modes may be included.

A first transmission mode is transmitting the signal a plurality of times on different frequency domain resources. A frequency domain width of the frequency domain resource is a maximum frequency domain width supported when a second terminal used to receive the signal receives the sidelink signal.

A second transmission mode is transmitting the signal by using a first resource. The first resource is determined based on a second resource occupied by the sidelink signal that is received by the first terminal.

In this application, the first message is used by the first terminal to indicate a transmission mode of the signal to the network device. Optionally, the first message is further used to indicate a data amount of signals transmitted by using the transmission mode of the signal. In this application, there are two indication manners for the first message.

In a first indication manner, the first message includes first indication information and second indication information, where the first indication information is used to indicate the transmission mode of the signal, and the second indication information is used to indicate the data amount of signals transmitted by using the transmission mode.

In a second indication manner, the first message includes first indication information, where the first indication information is used to indicate a data amount of signals, and a mapping relationship between the first indication information and the transmission mode of the signal may be predefined in a protocol or configured by using higher layer signaling.

Particularly, when the transmission mode, indicated in the first message, of the signal is a manner of transmitting the signal on the first resource, the first message further includes, based on any one of the foregoing indication manners, indication information used to indicate the first resource or the second resource.

In this application, the second message is used to indicate to the first terminal the resource used to transmit the signal, and different indication manners are used in different scenarios.

In a first indication manner, the network device sends third indication information and fourth indication information to the first terminal by using the second message.

In a second indication manner, the network device sends third indication information to the first terminal by using the second message.

In a third indication manner, the network device sends third indication information and fifth indication information to the first terminal by using the second message.

In a fourth indication manner, the network device sends third indication information, fourth indication information and fifth indication information to the first terminal by using the second message.

In a fifth indication manner, the network device sends third indication information, fourth indication information, and sixth indication information to the first terminal by using the second message.

In a sixth indication manner, the network device sends third indication information and sixth indication information to the first terminal by using the second message.

In a seventh indication manner, the network device sends third indication information, fifth indication information and sixth indication information to the first terminal by using the second message.

In an eighth transmission mode, the network device sends third indication information, fourth indication information, fifth indication information and sixth indication information to the first terminal by using the second message.

In a ninth indication manner, the network device sends fourth indication information, fifth indication information and sixth indication information to the first terminal by using the second message.

In a tenth indication manner, the network device sends fifth indication information and sixth indication information to the first terminal by using the second message.

In an eleventh indication manner, the network device sends fourth indication information and sixth indication information to the first terminal by using the second message.

In a twelfth indication manner, the network device sends sixth indication information to the first terminal by using the second message.

In the first to twelfth indication manners described above, the third indication information is used to indicate a resource pool, the fourth indication information is used to indicate a third resource, the fifth indication information is used to indicate a transmission mode, and the sixth indication information is used to indicate a start frequency-domain location or an end frequency-domain location of a resource that may be used when the signal is transmitted, or indicate a narrowband that may be used when the signal is transmitted.

According to a third aspect, this application provides a first terminal, including a transmitter, a receiver, and a processor.

The processor is configured to configure a first message, where the first message is used to indicate a transmission mode used by the first terminal to transmit a signal; the transmitter is configured to send the first message to a network device; the receiver is configured to receive a second message sent by the network device, where the second message is used to indicate a resource used by the first terminal to transmit the signal; and the transmitter is further configured to transmit the signal on the resource. It may be understood that various components included in the first terminal according to the third aspect may be used to perform the method according to the first aspect. For details, refer to the foregoing descriptions.

According to a fourth aspect, this application provides another first terminal, including a sending unit, a receiving unit, and a processing unit. The processing unit is configured to configure a first message, where the first message is used to indicate a transmission mode used by the first terminal to transmit a signal; the sending unit is configured to send the first message to a network device; the receiving unit is configured to receive a second message sent by the network device, where the second message is used to indicate a resource used by the first terminal to transmit the signal; and the sending unit is further configured to transmit the signal on the resource.

It may be understood that functional units included in the first terminal according to the fourth aspect may be used to perform the method according to the first aspect. For details, refer to the foregoing descriptions.

According to a fifth aspect, this application provides a network device, including a transmitter, a receiver, and a processor.

The receiver is configured to receive a first message sent by a first terminal, where the first message is used to indicate a transmission mode used by the first terminal to transmit a signal; the processor is configured to configure a second message, where the second message is used to indicate a resource used by the first terminal to transmit the signal; and the transmitter is configured to send the second message to the first terminal. It may be understood that various components included in the network device according to the fifth aspect may be used to perform the method according to the second aspect. For details, refer to the foregoing descriptions.

According to a sixth aspect, this application provides another network device, including a sending unit, a receiving unit, and a processing unit. The receiving unit is configured to receive a first message sent by a first terminal, where the first message is used to indicate a transmission mode used by the first terminal to transmit a signal; the processing unit is configured to configure a second message, where the second message is used to indicate a resource used by the first terminal to transmit the signal; and the sending unit is configured to send the second message to the first terminal.

It may be understood that functional units included in the network device according to the sixth aspect may be used to perform the method according to the second aspect. For details, refer to the foregoing descriptions.

According to a seventh aspect, this application provides a computer-readable storage medium. An instruction is stored in the computer-readable storage medium. When the instruction is run on a computer, the computer is enabled to perform the method in any one of the first aspect or possible implementations of the first aspect.

According to an eighth aspect, this application provides a computer program product that includes an instruction. When the instruction is run on a computer, the computer is enabled to perform the method in any one of the first aspect or possible implementations of the first aspect.

According to a ninth aspect, this application provides a computer-readable storage medium. An instruction is stored in the computer-readable storage medium. When the instruction is run on a computer, the computer is enabled to perform the method in any one of the second aspect or possible implementations of the second aspect.

According to a tenth aspect, this application provides a computer program product that includes an instruction. When the instruction is run on a computer, the computer is enabled to perform the method in any one of the second aspect or possible implementations of the second aspect.

In implementation of this application, when requesting, from the network device, the resources used to send the information, the first terminal notifies the network device of the transmission mode of the signal, so that the network device may configure corresponding resources for the first terminal, and the first terminal may determine the target resource from the configured resources and transmit, by using the target resource, the signal in a corresponding transmission mode.

BRIEF DESCRIPTION OF DRAWINGS

FIG. 4a and FIG. 4b are schematic diagrams of two types of first message according to this application;

FIG. 5 is a schematic diagram of relative locations of a third resource on a narrowband according to this application;

DESCRIPTION OF EMBODIMENTS

Terms used in implementation part of this application are only used to explain specific embodiments of this application, and are not intended to limit this application.

Figure 2:
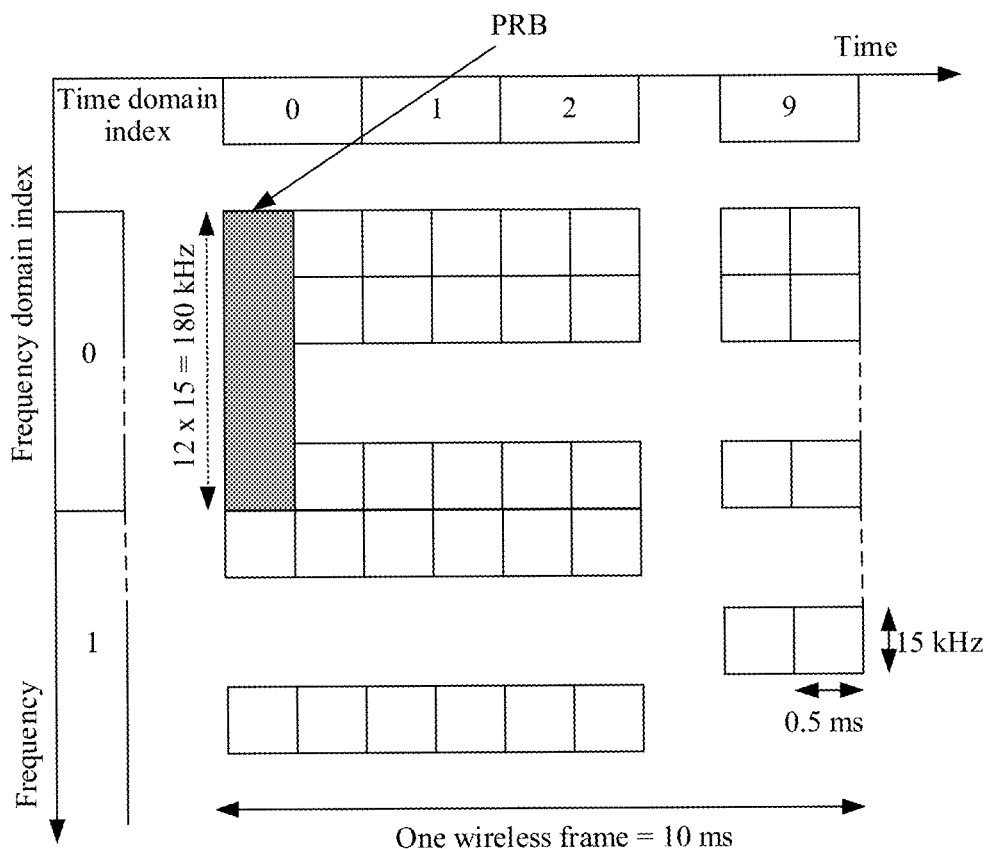
FIG. 2 is a schematic diagram of time-frequency domain resources in a D2D communications system.

FIG. 2 is a schematic diagram of time-frequency domain resources in a D2D communications system.

In time domain, one slot (slot) has a length of 0.5 ms, and includes seven single-carrier frequency division multiple access (SC-FDMA) symbols in a general configuration. One subframe includes two slots and has a size of 1 ms. One radio frame includes 10 subframes, and each radio frame has a length of 10 ms. The subframe is identified by using a subframe index.

In frequency domain, D2D sidelink (sidelink) bandwidth includes a plurality of subcarriers, and a quantity of subcarriers corresponding to different sidelink bandwidth are different. The bandwidth can be represented by a quantity of physical resource blocks (physical resource block, PRB) included in frequency domain.

A unit corresponding to 0.5 ms in time domain and 12 consecutive subcarriers in frequency domain is referred to as a physical resource block. Each physical resource block is indicated by a time domain index in time domain and a frequency domain index in frequency domain. The time domain index may be a subframe index, and the frequency domain index may be a PRB index. For example, the physical resource block shown in FIG. 2 is collectively indicated by a time domain index 0 and a frequency domain index 0. When a network device schedules a resource for a first terminal, the scheduling is performed by using two PRBs, namely, a PRB pair (PRB-pair), in one subframe (1 ms) as a basic physical resource unit.

It should be noted that FIG. 2 is a schematic diagram of time-frequency domain resources based on a long term evolution (LTE) technology. In a future new radio access technology (New RAT), for example, 4.5G, 5G, or the like available in the future, a subcarrier width, a length of a slot, a symbol for transmission, and definition and a name of a subframe, a PRB, a PRB-pair, and the like may change, and this application is also applicable to a scenario after the change.

Figure 1:
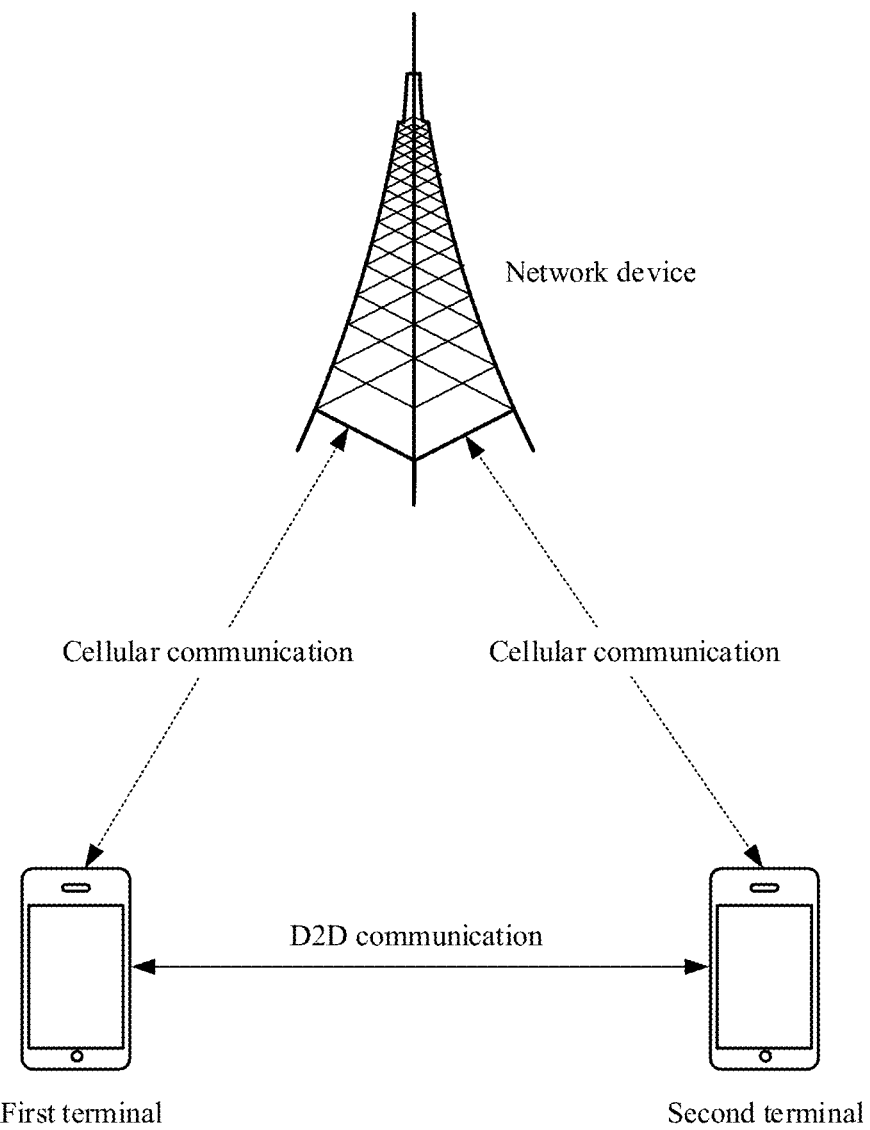
FIG. 1 is a schematic diagram of a network structure of a D2D communications system.

Referring to FIG. 1, in a communications system shown in FIG. 1, a network device configures a radio resource for a first terminal, and the first terminal performs signal transmission with a second terminal by using the configured radio resource.

The following describes a process in which the network device allocates a radio resource for the first terminal to implement D2D communication in the prior art. The D2D communication includes sidelink communication, sidelink discovery, and vehicle-to-vehicle sidelink communication.

First, before the D2D communication, the first terminal sends request information to the network device, to enable the network device to allocate a wireless resource for the first terminal, to send a sidelink signal, for example, a related signal in a process of sidelink communication, sidelink discovery, vehicle-to-vehicle sidelink communication or the like. According to 3GPP Release 12, the first terminal requests a radio resource from the network device by using a SidelinkUEInformation message, and sets a value of a field discTxResourceReq in the SidelinkUEInformation to indicate a quantity of messages that need to be sent.

Then the network device receives the request sent by the first terminal and configures a radio resource for the first terminal. According to 3GPP Release 12, when configuring the radio resource for the first terminal, the network device indicates a resource pool and indicates at least one reference PRB-pair in the resource pool for the first terminal.

When the network device indicates a resource pool for the first terminal, the network device needs to specifically indicate a quantity of resource blocks (prb-Num), an index of a start resource block (prb-Start), an index of an end resource block (prb-End) and a time domain resource included in the resource pool. Herein physical resource blocks in the resource pool configured by the network device for the first terminal are not necessarily dedicated to the first terminal. The physical resource blocks in the resource pool may be completely different from, or partially the same or all the same to, physical resource blocks in a resource pool configured by the network device for another first terminal.

When the network device indicates a reference PRB-pair for the first terminal, the network device needs to specifically indicate a time domain index and a frequency domain index of the reference PRB-pair.

Last, the first terminal determines, based on the reference PRB-pair, PRB-pairs that are in the resource pool and that are used to transmit a signal, and transmits the signal by using the determined PRB-pairs.

Referring to the TS36.213 standard in 3GPP, it may be learned that the first terminal can determine the PRB-pairs based on a fixed algorithm.

Apparently, in the prior art, when transmitting a signal, the first terminal determines the PRB-pairs to be used in a fixed manner by default, that is, the first terminal transmits the signal in a same transmission mode.

However, with the development of the D2D communication, the first terminal may transmit a signal in a plurality of transmission modes other than the foregoing transmission mode. In this case, when the first terminal transmits the signal, for different transmission modes, different PRB-pairs are correspondingly used.

For example, the resource pool configured by the network device for the first terminal includes a PRB-pair 1, a PRB-pair 2, and a PRB-pair 3, and the network device indicates that a reference PRB-pair is the PRB-pair 1. As shown in the table below, when the first terminal transmits the signal in a transmission mode 1, the PRB-pair 1 and the PRB-pair 3 are correspondingly used; when the first terminal transmits the signal in a transmission mode 2, the PRB-pair 1 and the PRB-pair 2 are correspondingly used.

TABLE 1

| Transmission mode | Resource block to be used |
| --- | --- |
| Transmission mode 1 | PRB-pair 1, PRB-pair 3 |
| Transmission mode 2 | PRB-pair 1, PRB-pair 2 |

It is assumed that the first terminal transmits, by using the PRB-pair 1 and the PRB-pair 3, the signal in a transmission mode 1, and a network device side does not know a transmission mode used by the first terminal, and may consider that the first terminal transmits, by using the PRB-pair 1 and the PRB-pair 2, the message in the transmission mode 2. In this case, the network device may configure the PRB-pair 3 to another first terminal for use, and prevents another first terminal from using the PRB-pair 2. Consequently, a collision between first terminals on the PRB-pair 3 occurs, and the PRB-pair 2 is wasted.

When the first terminal may transmit the signal in different transmission modes, to avoid the foregoing problem, this application provides a signal transmission method in which the first terminal reports transmission modes to be used to transmit the signal when requesting a radio resource from the network device. In addition, when the network device configures the radio resource for the first terminal, a transmission mode may be indicated, so that the first terminal determines, by using the indicated transmission mode, a resource to be used when the signal is transmitted.

In this application, one resource may be a PRB-pair defined in the prior art, or may be a physical resource block that occupies any duration in time domain and any bandwidth in frequency domain, where the any duration and the any bandwidth may be configured by the network device or specified in a protocol. This is not limited in this application.

First, several transmission modes that may be used when the first terminal sends a D2D signal are described. In this application, the signal is transmitted in a manner of using a resource when the first terminal transmits the signal.

In a first aspect, the transmission mode is classified based on a maximum frequency domain width. In this case, there may be a plurality of transmission modes, namely, manners of transmitting the signal by using resources within different maximum frequency domain widths.

Herein the maximum frequency domain width may be determined based on a maximum frequency domain width supported when a second terminal used to receive the signal sent by the first terminal receives a sidelink signal.

The maximum frequency domain width may be measured in hertz (Hz).

Specifically, each terminal has a different bandwidth capability, and some terminals can only send and receive the signal within a limited bandwidth. For example, in a subject of FeD2D (further enhancements to LTE Device to Device), some terminals support sending and receiving a signal within full sidelink bandwidth, some terminals support sending and receiving a signal only within a 6-PRB frequency domain width, and some terminals support sending and receiving a signal only within a 1-PRB frequency domain width. A bandwidth capability of the second terminal that receives the signal may belong to any one of the foregoing cases, and the cases are used as examples to describe transmission modes below in detail.

A first transmission mode is transmitting the signal by using a resource within full bandwidth. This transmission mode is applicable to a scenario in which the bandwidth capability of the second terminal that receives the signal is not limited. When a frequency domain width of a configured resource pool exceeds sidelink bandwidth, the first terminal can use any resource that is within the sidelink bandwidth and that is in the resource pool to transmit the signal. When the frequency domain width of the configured resource pool does not exceed the sidelink bandwidth, the first terminal can use any resource in the resource pool to transmit the signal. For example, when the first transmission mode is used, the first terminal can use a PRB-pair with frequency domain indexes of 0 and 1 to transmit a signal for a first time, and uses a PRB-pair with frequency domain indexes of 10 and 11 to transmit a signal for a second time. The signals in the two transmission processes may be a same signal or may be different signals.

A second transmission mode is transmitting the signal by using a resource within a 6-PRB frequency domain width. This transmission mode is applicable to a scenario in which a limited bandwidth of the second terminal that receives the signal is the 6-PRB frequency domain width. Certainly, this transmission mode is also applicable to a scenario in which the bandwidth capability of the second terminal is not limited. When a frequency domain width of a configured resource pool exceeds the 6-PRB frequency domain width, the first terminal can use any resource that is within the 6-PRB frequency domain width and that is in the resource pool to transmit the signal. When the frequency domain width of the configured resource pool does not exceed the 6-PRB frequency domain width, the first terminal can use any resource in the resource pool to transmit a signal. For example, when the second transmission mode is used, the first terminal can use a PRB-pair with frequency domain indexes of 0 and 1 to transmit a signal for a first time, use a PRB-pair with frequency domain indexes of 2 and 3 to transmit a signal for a second time, use a PRB-pair with frequency domain indexes of 4 and 5 to transmit a signal for a third time, and use the PRB-pair with the frequency domain indexes of 0 and 1 to transmit a signal for a fourth time. The signals in the four transmission processes may be a same signal or may be different signals. Apparently, during the four signal transmission processes, a span of two PRB-pairs (PRB-pair 0 and PRB-pair 5) having a largest interval in frequency domain is 6 times of bandwidth occupied by each PRB-pair in frequency domain, and all resources used by the first terminal are within the 6-PRB frequency domain width.

Optionally, the second transmission mode is a manner in which the first terminal transmits a same signal a plurality of times by using a resource within a 6-PRB frequency domain width. Herein the same signal may be a same physical signal, or may be different physical signals for transmitting a same message.

Optionally, the second transmission mode is a manner in which the first terminal transmits a same signal a plurality of times in a period by using a resource within a 6-PRB frequency domain width. To be specific, the second terminal transmits the same signal a plurality of times in each period by using a resource within a frequency domain width having different six PRBs. For example, in a first period, a resource within a frequency domain width of 0-5 PRBs may be used to transmit a same signal a plurality of times; and in a second period, a resource within a frequency domain width of 6-11 PRBs may be used to transmit a same signal a plurality of times.

A third transmission mode is transmitting the signal by using a resource within a 1-PRB frequency domain width. This transmission mode is applicable to a scenario in which a limited bandwidth of the second terminal that receives the signal is the 1-PRB frequency domain width. Certainly, this transmission mode is also applicable to a scenario in which the bandwidth capability of the second terminal is not limited or the limited bandwidth is the 6-PRB frequency domain width. When a frequency domain width of a configured resource pool exceeds the 1-PRB frequency domain width, the first terminal can use any resource that is within the 1-PRB frequency domain width and that is in the resource pool to transmit the signal. When the frequency domain width of the configured resource pool does not exceed the 1-PRB frequency domain width, the first terminal can use any resource in the resource pool to transmit the signal. For example, when the third transmission mode is used, the first terminal can use two PRB-pairs whose time domain indexes respectively are 0 and 1 and whose frequency domain index is 0 to transmit the signal, or use only one PRB-pair whose time domain index is 0 and whose frequency domain index is 0 to transmit the signal.

Optionally, the third transmission mode is a manner in which the first terminal transmits a same signal a plurality of times by using a resource within a 1-PRB frequency domain width.

Optionally, the third transmission mode is a manner in which the first terminal transmits a same signal a plurality of times in a period by using a resource within a 1-PRB frequency domain width.

The foregoing transmission modes are merely examples. In specific implementation, more transmission modes may be included, such as a manner of transmitting the signal by using a resource within a 2-PRB frequency domain width, a manner of transmitting the signal by using a resource within a 4-PRB frequency domain width, and a manner of transmitting the signal by using a resource within X kHz, where X kHz is less than or equal to the sidelink bandwidth. In this application, one resource may be a physical resource block that occupies any duration in time domain and any bandwidth in frequency domain. This is not limited in this application.

In a second aspect, the transmission mode is classified based on a second terminal that receives a signal.

In an optional embodiment, the following three transmission modes may be included.

A first transmission mode is transmitting the signal to a second terminal whose bandwidth capability is not limited. In this transmission mode, the signal sent by the first terminal can be received by the second terminal whose bandwidth capability is not limited.

A second transmission mode is transmitting the signal to a second terminal having limited bandwidth of a 6-PRB frequency domain width. In this transmission mode, the signal sent by the first terminal can be received by the second terminal having limited bandwidth of six PRBs.

A third transmission mode is transmitting the signal to a second terminal having limited bandwidth of a 1-PRB frequency domain width. In this transmission mode, the signal sent by first terminal can be received by the second terminal having limited bandwidth of a 1-PRB frequency domain width.

The foregoing transmission modes are merely examples. In specific implementation, more transmission modes may be included, such as a manner of transmitting the signal to a second terminal having limited bandwidth of a 2-PRB frequency domain width, a manner of transmitting the signal to a second terminal having limited bandwidth of a 4-PRB frequency domain width. This is not limited in this application.

In another optional embodiment, the following two transmission modes may be included.

A first transmission mode is transmitting the signal to an NB-IoT terminal. The NB-IoT terminal supports sending and receiving the signal only on a frequency domain width within one PRB.

A second transmission mode is transmitting the signal an eMTC terminal. The eMTC terminal supports sending and receiving the signal only on a frequency domain width within six PRBs.

In a third aspect, the following two transmission modes may be included.

A first transmission mode is transmitting the signal a plurality of times on different frequency domain resources. A frequency domain width of the frequency domain resource is a maximum frequency domain width supported when a second terminal used to receive the signal receives a sidelink signal.

Optionally, the first transmission mode is transmitting a same signal a plurality of times on different frequency domain resources in a same period.

Figure 3:
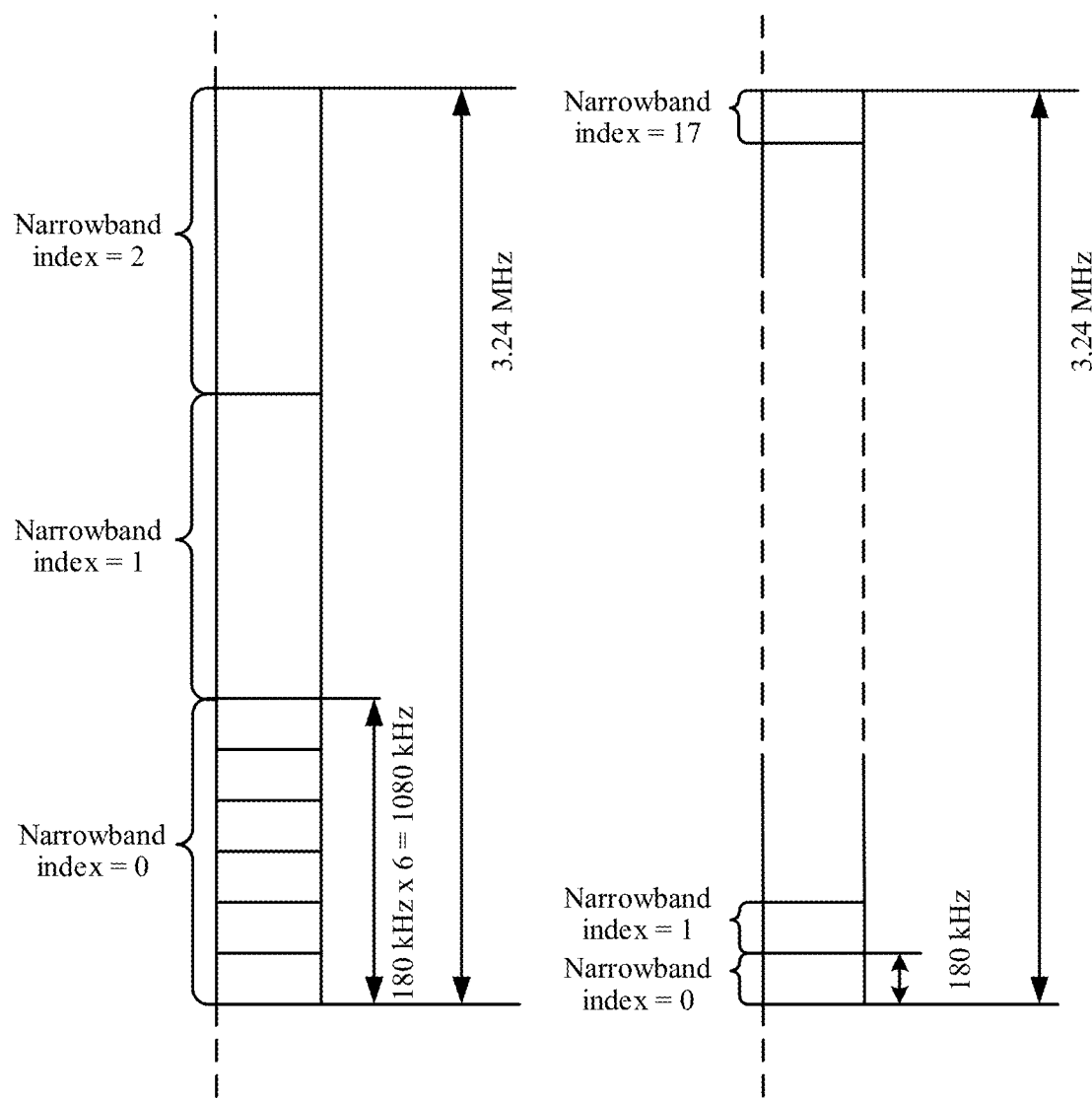
FIG. 3 is a schematic diagram of narrowband division according to this application.

Referring to the left part of FIG. 3, a sidelink bandwidth or a resource pool can be divided into a plurality of narrowbands having a same frequency domain width in frequency domain, and each narrowband is identified by using a narrowband index. The frequency domain width of each narrowband is determined based on a maximum frequency domain width supported by the second terminal used to receive the signal. For example, when a limited bandwidth of the second terminal used to receive the signal is six PRBs, a sidelink having a total bandwidth of 3.24 MHz can be divided into three narrowbands with a frequency domain width of six PRBs, and the three narrowbands can be identified by using indexes ranging from 0 to 2.

That the signal is transmitted a plurality of times on different frequency domain resources is equivalent to transmitting a same signal a plurality of times on different narrowbands. Specifically, the same signal may be transmitted a plurality of times on a plurality of narrowbands of a same resource pool, or the same signal may be transmitted a plurality of times on narrowbands in different resource pools.

When the same signal is transmitted a plurality of times on the plurality of narrowbands of the same resource pool, for example, narrowband division in a resource pool configured for a terminal is shown in the left part of FIG. 3, the first terminal may transmit the signal on two PRB-pairs in a narrowband with an index of 0 for a first time, transmit the signal on two PRB-pairs in a narrowband with an index of 1 for a second time, transmit the signal on two PRB-pairs in a narrowband with an index of 2 for a third time, and so on. A quantity of times the first terminal transmits the signal may be configured by a network device. By using the first transmission mode, the second terminal only needs to receive the signal on one of the narrowbands, to improve efficiency.

When the same signal is transmitted a plurality of times on the narrowbands in different resource pools, for example, two resource pools are configured for the first terminal: a resource pool 1 and a resource pool 2, narrowband division in the resource pool 1 and the resource pool 2 is shown in the left part of FIG. 3. The first terminal may transmit, for a first time, the signal on two PRB-pairs in a narrowband that is in the resource pool 1 and that has an index of 0, and transmit, for a second time, the signal on two PRB-pairs in a narrowband that is in the resource pool 2 and that has an index of 1. Optionally, a frequency domain width of a resource pool configured to a terminal may be the same as that of a narrowband.

A second transmission mode is transmitting the signal by using a first resource. The first resource is determined based on a second resource occupied by a sidelink signal that is received by the first terminal.

Specifically, the first terminal may determine the first resource based on the second resource occupied by received one or more sidelink signals, where the received one or more sidelink signals may be sent by a second terminal or another terminal. There may be a plurality of manners for determining the first resource, and this application provides the following possible implementations as examples.

In a possible implementation, the first terminal directly uses, as a frequency domain index of the first resource, a frequency domain index of a second resource occupied by a sidelink signal that is received at any one time.

In a possible implementation, the first terminal determines a frequency domain index of a second resource occupied by a sidelink signal that is received at any one time, and n is added to the frequency domain index to obtain a frequency domain index of the first resource, where n is positive integer. For example, a second resource occupied by a sidelink signal that is received at the last time is PRB-pairs respectively having frequency domain indexes of 0 and 1, and 2 is separately added to 0 and 1, to respectively obtain frequency domain indexes of 2 and 3 of the first resource. It is equivalent to that the first resource is two PRB-pairs having frequency domain indexes of 2 and 3. After the frequency domain indexes of the second resource are determined, a terminal may randomly determine time domain indexes of the second resource to determine the second resource.

In a possible implementation, sidelink bandwidth can be divided into several narrowbands. The first terminal can determine a narrowband on which a second resource occupied by a sidelink signal that is received at any one time is located, and randomly select one or more resources on the narrowbands as the first resource.

No Limitation is imposed on the manner of determining the first resource based on a second resource occupied by a received sidelink signal. In a specific implementation, the first resource may be also determined based on the second resource in another manner. This is not limited in this application.

Classification of signal transmission modes are described respectively based on the foregoing three aspects. In this application, when the first terminal transmits a signal, any one or more of the foregoing transmission modes may be used. In this case, when the first terminal sends a message to the network device to request a resource for transmitting the signal, the first terminal also notify, by using the message, the network device of a signal transmission mode supported by the first terminal, or a signal transmission mode that the first terminal expects to use. Herein the message sent to the network device by the first terminal is referred to as a first message.

The first message can be implemented as RRC layer signaling, a medium access control control element (MAC CE) or sidelink control information (SCI). In a specific implementation, the first message may be implemented by adding a field or by using a reserved field in an existing message, or by adding a new message type.

A function of the first message is to request from the network device a resource for transmitting the signal by the first terminal, and the first message indicates a transmission mode of the signal. Optionally, the first message further indicates a data amount of signals transmitted by using the transmission mode of the signal. Herein the first message can indicate the foregoing two pieces of information in the following two optional manners. Detailed descriptions are provided below.

In a first indication manner, the first message includes first indication information and second indication information, where the first indication information is used to indicate the transmission mode of the signal, and the second indication information is used to indicate the data amount of signals transmitted by using the transmission mode. Herein the data amount of signals may be a quantity of the signals.

Referring to FIG. 4a, a first message may include a plurality of pieces of first indication information and a plurality of pieces of second indication information that are corresponding to the plurality of pieces of first indication information. It may be defined that a field or an information element (IE) includes one piece of first indication information and corresponding second indication information.

In an optional embodiment, each IE or field can be implemented as an SL-DiscTxResourceReq field as follows:

```
SL-DiscTxResourceReq ::= SEQUENCE {
  transmissionType     ENUMERATED {fullBW, 6 PRB, 1 PRB}
  discTxResourceReq    INTEGER (1...63)
}
```

The SL-DiscTxResourceReq field includes two fields: transmissionType and discTxResourceReq.

The transmissionType is first indication information and indicates a signal transmission mode. The indicated transmission mode herein may be any one of the foregoing transmission modes classified based on the maximum frequency domain width or based on an enhanced method. When the transmission mode indicated by the transmissionType is any one of the foregoing transmission modes classified based on the maximum frequency domain width, the transmissionType may directly indicate the maximum frequency domain width, for example, directly indicating six PRBs, one PRB, or the like.

It may be understood that cases in which the transmissionType indicates the manner of transmitting the signal by using a resource within full bandwidth, the manner of transmitting the signal by using a resource within six PRBs, and the manner of transmitting the signal by using a resource within one PRB that are listed above are only examples. In a specific implementation, the transmissionType field may also indicate another transmission mode as described above. This is not limited in this application.

The discTxResourceReq is second indication information and indicates a data amount of signals transmitted by using the transmission mode indicated in the transmissionType. Herein the data amount may be measured by using a quantity of signals.

In the foregoing optional embodiment, each SL-DiscTxResourceReqIE or field directly indicates the transmission mode by using the transmissionType field. In another optional embodiment, the first terminal indicates a sidelink discovery model in the first message to be sent, and indirectly indicates the transmission mode in the sidelink discovery model, where the sidelink discovery model and the transmission mode are in a one-to-one correspondence.

In a discovery process of D2D communication, there are two discovery models: model A and model B. In the model A, the first terminal sends a UE-to-network relay discovery announcement message to a second terminal. In the model B, the first terminal sends a UE-to-network relay discovery response message to the second terminal. Optionally, when sending the UE-to-Network Relay Discovery Announcement message, the first terminal uses the manner of transmitting the signal a plurality of times on different frequency domain resources in the foregoing third aspect. When sending the UE-to-Network Relay Discovery Response, the first terminal uses the manner of transmitting the signal by using a first resource. Therefore, as shown in the table below, the model A corresponds to the manner of transmitting the signal a plurality of times on different frequency domain resources, and the model B corresponds to the manner of transmitting the signal by using a first resource.

TABLE 2

| Sidelink discovery model | Transmission mode |
| --- | --- |
| Model A | Manner of transmitting a signal a plurality of times on different frequency domain resources |
| Model B | Manner of transmitting a signal by using a first resource |

Based on the correspondence shown in Table 2, each IE or field can also indirectly indicate the transmission mode by using the sidelink discovery model. Each IE can be implemented as an SL-DiscTxResourceReq field as follows:

```
SL-DiscTxResourceReq ::= SEQUENCE {
    ModeIndication      ENUMERATED {modelA, modelB}
    discTxResourceReq   INTEGER (1...63)
}
```

The SL-DiscTxResourceReq field includes two fields: ModeIndication and discTxResourceReq.

The ModeIndication is first indication information, directly indicates a sidelink discovery model used for transmitting the signal, and indirectly indicates a transmission mode corresponding to the sidelink discovery model.

The discTxResourceReq is second indication information, and indicates a data amount of signals that corresponds to the transmission mode indicated in the ModeIndication field.

In a second indication manner, the first message includes first indication information, where the first indication information is used to indicate a data amount of signals, and a mapping relationship between the first indication information and the transmission mode of the signal may be predefined in a protocol or configured by using higher layer signaling. The network device and the first terminal both learn of a mapping relationship between the first indication information and the transmission mode of the signal in advance.

Referring to FIG. 4b, the first message may include a plurality of pieces of first indication information, and each piece of first indication information corresponds to a transmission mode.

In an optional embodiment, the first message may include an SL-DiscTxResourceReq field as follows:

```
SL-DiscTxResourceReq ::= SEQUENCE {
    discTxResourceReqFullBW    INTEGER (1...63)
    discTxResourceReq6PRB      INTEGER (1...63)
    discTxResourceReq1PRB      INTEGER (1...63)
}
```

The SL-DiscTxResourceReq field includes three fields: discTxResourceReqFullBW, discTxResourceReq6PRB and discTxResourceReq1PRB. The three fields all are the first indication information. The discTxResourceReqFullBW corresponds to the manner of transmitting a signal by using a resource within full bandwidth, and indicates a data amount of signals transmitted when the manner of transmitting the signal by using a resource within full bandwidth is used. The discTxResourceReq6PRB corresponds to the manner of transmitting the signal by using a resource within six PRBs, and indicates a data amount of signals transmitted when the manner of transmitting the signal by using a resource within six PRBs is used. The discTxResourceReq1PRB corresponds to the manner of transmitting the signal by using a resource within one PRB, and indicates a data amount of signals transmitted when the manner of transmitting the signal by using a resource within one PRB is used. It should be understood that the three types of first indication information listed above are only examples. In a specific implementation, more first indication information may be included, for example, first indication information respectively corresponding to a manner of transmitting the signal by using a resource within two PRBs or four PRBs.

Particularly, when the transmission mode, indicated in the first message, of the signal is a manner of transmitting the signal on the first resource, the first message further includes, based on any one of the foregoing indication manners, indication information used to indicate the first resource or a second resource. The second resource is a resource occupied by a sidelink signal received by the first terminal. When the first message includes the indication information used to indicate the first resource, the network device may directly learn of the first resource. When the first message includes the indication information used to indicate the second resource, the network device may determine the first resource based on the second resource. When learning of the first resource, the network device may configure the first resource for the first terminal to transmit a signal.

No Limitation is imposed on the foregoing two indication manners of the first message. In a specific implementation, an indication function of the first message may be implemented in another manner. This is not limited in this application.

According to the foregoing two indication manners of the first message, the first terminal may notify the network device of a signal transmission mode supported by the first terminal or a signal transmission mode that the first terminal expects to use, and the data amount of signals transmitted by using each transmission mode, so that the network device can allocate a resource to the first terminal based on the different transmission modes and the data amount.

In this application, after receiving the first message sent by the first terminal, the network device sends a message to the first terminal to indicate a resource allocated to the first terminal. Herein the message sent by the network device to the first terminal may be referred to as a second message.

The second message can be implemented as RRC layer signaling, a medium access control control element or sidelink control information. In a specific implementation, the second message may be implemented by adding a field, or by using a reserved field in an existing message, or by adding a new message type.

A function of the second message is to indicate, to the first terminal, a resource for transmitting the signal. In different scenarios, different manners are used by the network device to indicate the resource to the first terminal by using the second message. A plurality of manners of the second message are described below in detail.

In a first indication manner, the network device sends third indication information and fourth indication information to the first terminal by using the second message.

The third indication information is used to indicate a resource pool, and the fourth indication information is used to indicate a third resource. The resource pool and the third resource are used by the first terminal to determine a target resource for transmitting the signal. The third indication information may indicate the resource pool by using a frequency domain index and a time domain index, and the fourth indication information may indicate the third resource also by using a frequency domain index and a time domain index.

Herein the third indication information and the fourth indication information may be included in a same second message, or may be separately included in a plurality of second messages. For example, the network device may send, to the first terminal for a first time, a second message that includes only the third indication information, and send, to the first terminal for a second time, a second message that includes only the fourth indication information, and the third indication information and the fourth indication information are sent to the first terminal by using the second messages that are separately sent in two times.

In a specific embodiment, the third indication information may be implemented as an SL-TF-ResourceConfig field or IE as follows:

```
SL-TF-ResourceConfig-r12 ::=    SEQUENCE{
    Prb-Num-r12                 INTEGER (1... 100),
    Prb-Start-r12               INTEGER (0...99),
```

-continued

```
    Prb-End-r12 INTEGER (0...99),
    offsetIndicator-r12              SL-OffsetIndicator-r12,
    subframeBitmap-r12               SubframeBitmapSL-r12
}
```

The SL-TF-ResourceConfig field or IE includes frequency-domain location information and time-domain location information that are of the resource pool configured by the network device for the first terminal. The frequency-domain location information of the resource pool includes a quantity of PRBs (prb-Num), a PRB start index (prb-Start), and a PRB end index (prb-End). PRBs included, in frequency domain, in the resource pool configured by the network device for the first terminal includes a PRB whose index is greater than or equal to the prb-start but less than the prb-start+the prb-num, and a PRB whose index is greater than the prb-end−the prb-num but less than or equal to the prb-end. The time-domain location of the resource pool is jointly indicated by using an SL-OffsetIndicator field and a SubframeBitmapSL field.

In a specific embodiment, the fourth indication information may be implemented as an SL-TF-IndexPair field or IE as follows:

```
SL-TF-IndexPairList-r12::=SEQUENCE(SIZE(1..maxSL-TF-IndexPair-
r12))OF SL-TF-IndexPair-r12
    SL-TF-IndexPair-r12 ::= SEQUENCE{
        DiscSF-Index-r12      INTEGER (1...200), OPTIONAL, --Need
ON
        DiscPRB-Index-r12 INTEGER (1...50), OPTIONAL, --Need ON
    }
```

The SL-TF-IndexPair field or IE includes a time domain index (discSF-Index) and a frequency domain index (discPRB-Index) of the third resource.

After receiving the second message, the first terminal determines, based on the resource pool and the third resource that are indicated in the second message, and a transmission mode indicated in the first message, a target resource used when the signal is transmitted by using the transmission mode in the first message, and the target resource belongs to the resource pool. Optionally, the first terminal determines, from the resource pool based on the third resource and the transmission mode, a target resource used when the signal is transmitted a plurality of times.

A specific example is used for description. It is assumed that the first message indicates two transmission modes in sequence: a transmission mode 1 (a manner of transmitting the signal a plurality of times on different frequency domain resources), and a transmission mode 2 (a manner of transmitting the signal by using the first resource). The first message also indicates a data amount of signals transmitted separately by using the transmission mode 1 and the transmission mode 2, as shown in Table 3 below:

TABLE 3

| Transmission mode | Data amount |
|---|---|
| Transmission mode 1: manner of transmitting a signal a plurality of times on different frequency domain resources | 2 |
| Transmission mode 2: a manner of transmitting a signal by using the first resource | 1 |

It is assumed that the second message indicates a resource pool, where frequency domain indexes of the resource pool range from 0 to 35, and also indicates three third resources in sequence whose frequency domain indexes are 0, 10, and 20 respectively.

After receiving the second message, the first terminal may separately determine a target resource used when three signals are transmitted. Details are as follows.

It is determined, based on the transmission mode 1 and a first third resource (a frequency domain index is 0), that target resources used when a first signal in corresponding data amount is transmitted by using the transmission mode 1 are: resources whose frequency domain indexes are 0 and 1 (used for transmission for a first time), resources whose frequency domain indexes are 6 and 7 (used for transmission for a second time), resources whose frequency domain indexes are 12 and 13 (used for transmission for a third time), and so on.

It is determined, based on the transmission mode 1 and a second third resource (a frequency domain index is 10), that target resources used when a second signal in corresponding data amount is transmitted by using the transmission mode 1 are: resources whose frequency domain indexes are 10 and 11 (used for transmission for a first time), resources whose frequency domain indexes are 16 and 17 (used for transmission for a second time), resources whose frequency domain indexes are 22 and 23 (used for transmission for a third time), and so on.

It is determined, based on the transmission mode 2 and a third third resource (a frequency domain index is 20), that target resources used when a signal is transmitted by using the transmission mode 2 are resources whose frequency domain indexes are 20 and 21 (used for each transmission).

A transmission times of the signal may be configured by the network device or specified in a protocol.

It may be understood that the foregoing description is merely an example. In a specific implementation, a manner in which the first terminal determines, based on the resource pool and the third resource that are indicated in the second message, and the transmission mode indicated in the first message, the target resources used when the transmission mode in the first message is used to transmit a corresponding signal may be different from the manner in the foregoing example.

In a second indication manner, the network device sends the third indication information to the first terminal by using the second message.

The third indication information is used to indicate a resource pool, where the resource pool is used by the first terminal to determine a target resource for transmitting a signal. The third indication information may indicate the resource pool by using a frequency domain index and a time domain index.

In a specific embodiment, same as that in the first indication manner, the third indication information may be implemented as an SL-TF-ResourceConfig field or IE. Refer to the foregoing related descriptions.

After receiving the second message, the first terminal may determine, based on the resource pool indicated in the second message, a transmission mode indicated in the first message and a third resource independently determined by the first terminal, a target resource used when the signal is transmitted by using the transmission mode in the first message, and the target resource belongs to the resource pool. Optionally, the first terminal determines, from the resource pool based on the third resource and the transmission mode, a target resource used when the signal is transmitted a plurality of times.

A specific example is used for description, where the example is similar to that in the first indication manner, and a difference is that in this example, the first terminal independently determines three third resources whose frequency domain indexes are 0, 10, and 20, respectively. For a manner in which the first terminal determines the target resource, refer to the example in the first indication manner. Details are not described herein again.

In a third indication manner, the network device sends third indication information and fifth indication information to the first terminal by using the second message.

The third indication information is used to indicate a resource pool, and the fifth indication information is used to indicate a transmission mode. The third indication information may indicate the resource pool by using a frequency domain index and a time domain index. The resource pool and the transmission mode are used by the first terminal to determine a target resource for transmitting the signal.

Herein the third indication information and the fifth indication information may be included in a same second message, or may be separately included in a plurality of second messages.

In a specific embodiment, the third indication information may be implemented as an SL-TF-ResourceConfig field or IE. Refer to the foregoing related descriptions.

In a specific embodiment, the fifth indication information may be implemented as a transmissionType field. For details, refer to related descriptions in the first indication manner of the first message.

After receiving the second message, the first terminal determines, based on the resource pool and the transmission mode that are indicated in the second message, and a third resource independently determined by the first terminal, a target resource used when the signal is transmitted by using the transmission mode in the second message, and the target resource belongs to the resource pool. Optionally, the first terminal determines, from the resource pool based on the third resource and the transmission mode, a target resource used when the signal is transmitted a plurality of times.

A specific example is used for description. It is assumed that the second message indicates a resource pool, and frequency domain indexes of the resource pool range from 0 to 35. The second message also indicates two transmission modes: a transmission mode 1 (a manner of transmitting the signal a plurality of times on different frequency domain resources), and a transmission mode 2 (a manner of transmitting the signal by using the first resource).

The first terminal uses the transmission model to transmit two signals: a signal 1 and a signal 2. The first terminal uses the transmission mode 2 to transmit one signal: a signal 3. The first terminal independently determines third resources that are respectively corresponding to the three signals, and frequency domain indexes are 0, 10, and 20 respectively.

It is determined, based on the transmission mode 1 and a third resource (a frequency domain index is 0) corresponding to the signal 1, that target resources used when the signal 1 is transmitted by using the transmission mode 1 are: resources whose frequency domain indexes are 0 and 1 (used for transmission for a first time), resources whose frequency domain indexes are 6 and 7 (used for transmission for a second time), resources whose frequency domain indexes are 12 and 13 (used for transmission for a third time), and so on.

It is determined, based on the transmission mode 1 and a third resource (a frequency domain index is 10) corresponding to the signal 2, that target resources used when the signal 2 is transmitted by using the transmission mode 1 are: resources whose frequency domain indexes are 10 and 11 (used for transmission for a first time), resources whose frequency domain indexes are 16 and 17 (used for transmission for a second time), resources whose frequency domain indexes are 22 and 23 (used for transmission for a third time), and so on.

It is determined, based on the transmission mode 2 and a third resource (a frequency domain index is 20) corresponding to the signal 3, that target resources used when the signal 3 is transmitted by using the transmission mode 2 are resources whose frequency domain indexes are 20 and 21 (used for each transmission).

A transmission times of a signal may be configured by the network device or specified in a protocol.

It may be understood that the foregoing description is merely an example. In a specific implementation, determining of the target resources by the first terminal may be implemented in more manners.

In a fourth indication manner, the network device sends third indication information, fourth indication information and fifth indication information to the first terminal by using the second message.

The third indication information is used to indicate a resource pool, the fourth indication information is used to indicate a third resource, and the fifth indication information is used to indicate a transmission mode. The third indication information may indicate the resource pool by using a frequency domain index and a time domain index, and the fourth indication information may indicate the third resource also by using a frequency domain index and a time domain index. The resource pool, the third resource and the transmission mode are used by the first terminal to determine a target resource for transmitting a signal.

Herein the third indication information, the fourth indication information and the fifth indication information may be included in a same second message, or may be separately included in a plurality of second messages.

In a specific embodiment, the third indication information may be implemented as an SL-TF-ResourceConfig field or IE, the fourth indication information may be implemented as an SL-TF-IndexPair field or IE, and the fifth indication information may be implemented as a transmissionType field. Refer to the foregoing related descriptions, and details are not described herein again.

After receiving the second message, the first terminal determines, based on the resource pool, the transmission mode and a third resource that are indicated in the second message, a target resource used when the signal is transmitted by using the transmission mode in the second message, and the target resource belongs to the resource pool. Optionally, the first terminal determines, from the resource pool based on the third resource and the transmission mode, a target resource used when the signal is transmitted a plurality of times.

A specific example is used for description. It is assumed that the second message indicates a resource pool, and frequency domain indexes of the resource pool range from 0 to 35. The second message also indicates two transmission modes: a transmission mode 1 (a manner of transmitting the signal a plurality of times on different frequency domain resources), and a transmission mode 2 (a manner of transmitting the signal by using the first resource). The second message also indicates three third resources (frequency domain indexes are 0, 10, and 20 respectively).

The first terminal uses the transmission model to transmit two signals: a signal 1 and a signal 2. The first terminal determines, based on the transmission mode 1 and a first third resource (a frequency domain index is 0), target resources used when the signal 1 is transmitted by using the transmission mode 1 are: resources whose frequency domain indexes are 0 and 1 (used for transmission for a first time), resources whose frequency domain indexes are 6 and 7 (used for transmission for a second time), resources whose frequency domain indexes are 12 and 13 (used for transmission for a third time), and so on.

The first terminal determines, based on the transmission mode 1 and a second third resource (a frequency domain index is 10), target resources used when the signal 2 is transmitted by using the transmission mode 1 are: resources whose frequency domain indexes are 10 and 11 (used for transmission for a first time), resources whose frequency domain indexes are 16 and 17 (used for transmission for a second time), resources whose frequency domain indexes are 22 and 23 (used for transmission for a third time), and so on.

The first terminal determines, based on the transmission mode 2 and a third third resource (a frequency domain index is 20), that target resources used when a signal 3 is transmitted by using the transmission mode 2 are resources whose frequency domain indexes are 20 and 21 (used for each transmission).

A transmission times of the signal may be configured by the network device or specified in a protocol.

It may be understood that the foregoing description is merely an example. In a specific implementation, determining of the target resources by the first terminal may be implemented in more manners.

It may be understood that the first indication manner to the fourth indication manner described above may be applied to the following three scenarios.

A first scenario is that the transmission mode indicated in the first message includes any one or more transmission modes of the foregoing third aspect.

A second scenario is that the transmission mode indicated in the first message includes any one or more transmission modes of the foregoing first aspect, and the frequency domain width of the resource pool configured by the network device to the terminal is the maximum frequency domain width in the foregoing first aspect.

A third scenario is that the transmission mode indicated in the first message includes any one or more transmission modes of the foregoing second aspect, and the frequency domain width of the resource pool configured by the network device to the terminal is the maximum frequency domain width supported by the second terminal in the foregoing second aspect.

In a fifth indication manner, the network device sends third indication information, fourth indication information, and sixth indication information to the first terminal by using the second message. Compared to the first indication manner, in the fifth indication manner, the sixth indication information is added.

The third indication information is used to indicate a resource pool, and the fourth indication information is used to indicate a third resource. The sixth indication information is used to indicate a start frequency-domain location or an end frequency-domain location of a resource that may be used when a signal is transmitted, or indicate a narrowband that may be used when the signal is transmitted. The third indication information may indicate the resource pool by using a frequency domain index and a time domain index, and the fourth indication information may indicate the third resource also by using a frequency domain index and a time domain index. When the sixth indication information is used to indicate a narrowband, the sixth indication information may indicate, by using a narrowband index, the narrowband that may be used when the signal is transmitted. The start frequency-domain location or the end frequency-domain location or the narrowband, the resource pool and the third resource are used by the first terminal to determine a target resource for transmitting the signal.

Herein, a frequency domain range of the resource that may be used when the signal is transmitted starts from the start frequency-domain location or ends at the end frequency-domain location. A frequency domain width of the resource that may be used is a maximum frequency domain width indicated in a transmission mode (when the transmission mode is any transmission mode in the foregoing first aspect or any transmission mode in the second aspect). Alternatively, a frequency domain range of the resource that may be used when the signal is transmitted is a frequency domain range in which the narrowband that may be used is located. A sidelink bandwidth or a resource pool can be divided, in frequency domain, into a plurality of narrowbands having a same frequency domain width, and each narrowband is identified by using a narrowband index. The frequency domain width of each narrowband is a maximum frequency domain width indicated in a transmission mode.

For example, FIG. 3 shows two possible narrowband division manners. A frequency domain width of sidelink bandwidth shown in FIG. 3 is an 18-PRB frequency domain width, that is, the sidelink bandwidth is 3.24 MHz. When the sidelink bandwidth is divided into narrowbands, a frequency domain width of each narrowband is a maximum frequency domain width in a transmission mode (when the transmission mode is any transmission mode in the first aspects), or a maximum frequency domain width supported by the second terminal in a transmission mode (when the transmission mode is any transmission mode in the second aspects).

Referring to the left part of FIG. 3, when the transmission mode is the manner of transmitting the signal by using a resource within a 6-PRB frequency domain width in the first aspect, the frequency domain width of the narrowband is 6-PRB frequency domain width, and there are three narrowband indexes: 0, 1, and 2. A frequency-domain location of the narrowband 0 is frequency-domain locations of PRBs whose indexes range from 0 to 5, a frequency-domain location of the narrowband 1 is frequency-domain locations of PRBs whose indexes range from 6 to 11, and a frequency-domain location of the narrowband 3 is frequency-domain locations of PRBs whose indexes range from 12 to 17.

Referring to the right part of FIG. 3, when the transmission mode is the manner of transmitting the signal by using a resource within a 1-PRB frequency domain width in the first aspect, 18 narrowbands each having a frequency domain width of one PRB may be included in a same sidelink bandwidth, and there are 18 narrowband indexes. A frequency-domain location of a narrowband 0 is a frequency-domain location of a PRB whose index is 0, a frequency-domain location of a narrowband 1 is a frequency-domain location of a PRB whose index is 1, and so on.

When the sixth indication information indicates a narrowband index, a terminal may determine, based on the transmission mode and the narrowband index, a narrowband that may be used. For example, when the transmission mode is transmitting the signal by using a resource within a 6-PRB frequency domain width, and the narrowband index is 0, the terminal may determine that a frequency domain width of the narrowband that may be used is a frequency domain width of PRBs whose indexes range from 0 to 5.

Herein the third indication information, the fourth indication information and the sixth indication information may be included in a same second message, or may be separately included in a plurality of second messages.

In a specific embodiment, the third indication information may be implemented as an SL-TF-ResourceConfig field or IE, the fourth indication information may be implemented as an SL-TF-IndexPair field or IE, and the sixth indication information may be implemented as a lowest-PRB-index field in detail as follows:

```
SL-DiscTFList ::= SEQUENCE (SIZE) of SL-DiscTF
SL-DiscTF ::= SEQUENCE {
   discTF-IndexPair                        SL-TF-IndexPair-r12
   lowest-PRB-index        INTEGER         OPTIONAL
}
```

The lowest-PRB-index field is a PRB start index, and corresponds to a third resource indicated in the discTF-IndexPair field. Optionally, the lowest-PRB-index field may be replaced with a narrowband-index field, and is used to indicate a narrowband index.

After receiving the second message, the first terminal determines, based on the resource pool, the third resource, and the start frequency-domain location or the end frequency-domain location or the narrowband that are indicated in the second message, and the transmission mode indicated in the first message, a target resource used when the signal is transmitted by using the transmission mode in the first message, and the target resource belongs to the resource pool. The first terminal determines that a frequency domain range of the target resource used when the signal is transmitted starts from the start frequency-domain location or ends at the end frequency-domain location, and a frequency domain width of the target resource used is a maximum frequency domain width indicated in a transmission mode (when the transmission mode is any transmission mode in the foregoing first aspect or any transmission mode in the second aspect). Alternatively, the first terminal determines that a frequency domain range of the target resource used when the signal is transmitted is a frequency domain range in which the indicated narrowband is located. Optionally, the first terminal determines, based on the maximum frequency domain width indicated in the transmission mode, a frequency domain width of each narrowband when narrowband division is performed.

A specific example is used for description. It is assumed that the first message indicates two transmission modes in sequence and corresponding data amount. It is assumed that the first terminal uses a transmission mode 1 to transmit two signals: a signal 1 and a signal 2, and uses a transmission mode 2 to transmit one signal: a signal 3. Refer to Table 4 below.

TABLE 4

| Transmission mode | Data amount |
|---|---|
| Transmission mode 1: transmitting a signal by using a resource within a 6-PRB frequency domain width | 2 |

TABLE 4-continued

| Transmission mode | Data amount |
|---|---|
| Transmission mode 2: transmitting a signal by using a resource within an 8-PRB frequency domain width | 1 |

It is assumed that the second message indicates a resource pool, where frequency domain indexes of the resource pool ranges from 0 to 35, and also indicates three third resources in sequence (frequency domain indexes are 4, 12, and 22 respectively) and three start frequency-domain locations (frequency domain indexes are 0, 10, and 20 respectively).

After receiving the second message, the first terminal may separately determine a target resource used when three signals are transmitted. Details are as follows.

The first terminal may determine, based on the transmission mode 1 and a first start frequency-domain location, that frequency domain indexes of resources that may be used range from 0 to 5 when the signal 1 is transmitted by using the transmission mode 1. The first terminal may determine, based on a first third resource (a frequency domain index is 4), target resources used when the signal 1 is transmitted are: resources whose frequency domain indexes are 4 and 5 (used for transmission for a first time), resources whose frequency domain indexes are 0 and 1 (used for transmission for a second time), resources whose frequency domain indexes are 2 and 3 (used for transmission for a third time), and so on.

The first terminal may determine, based on the transmission mode 1 and a second start frequency-domain location, that frequency domain indexes of resources that may be used range from 10 to 15 when the signal 2 is transmitted by using the transmission mode 1. The first terminal may determine, based on a second third resource (a frequency domain index is 12), target resources used when the signal 2 is transmitted are: resources whose frequency domain indexes are 12 and 13 (used for transmission for a first time), resources whose frequency domain indexes are 14 and 15 (used for transmission for a second time), resources whose frequency domain indexes are 10 and 11 (used for transmission for a third time), and so on.

The first terminal may determine, based on the transmission mode 2 and a third start frequency-domain location, that frequency domain indexes of resources that may be used range from 20 to 27 when the signal 3 is transmitted by using the transmission mode 2. The first terminal may determine, based on a third third resource (a frequency domain index is 22), target resources used when the signal 3 is transmitted are: resources whose frequency domain indexes are 22 and 23 (used for transmission for a first time), resources whose frequency domain indexes are 24 and 25 (used for transmission for a second time), resources whose frequency domain indexes are 26 and 27 (used for transmission for a third time), resources whose frequency domain indexes are 20 and 21 (used for transmission for a fourth time), and so on.

A transmission times of the signal may be configured by the network device or specified in a protocol.

It may be understood that the foregoing description is merely an example. In a specific implementation, determining of the target resources by the first terminal may be implemented in more manners.

In a sixth indication manner, the network device sends third indication information and sixth indication information to the first terminal by using the second message.

The third indication information is used to indicate a resource pool, and the sixth indication information is used to indicate a start frequency-domain location or an end frequency-domain location of a resource that may be used when the signal is transmitted, or indicate a narrowband that may be used when the signal is transmitted. The third indication information may indicate the resource pool by using a frequency domain index and a time domain index. When the sixth indication information is used to indicate a narrowband, the sixth indication information may indicate, by using a narrowband index, the narrowband that may be used when the signal is transmitted. The start frequency-domain location or the end frequency-domain location or the narrowband, and the resource pool are used by the first terminal to determine a target resource for transmitting the signal.

Herein the third indication information and the sixth indication information may be included in a same second message, or may be separately included in a plurality of second messages.

For implementation of the third indication information and the sixth indication information, refer to related descriptions in the fifth indication manner. Details are not described herein.

After receiving the second message, the first terminal may determine, based on the resource pool and the start frequency-domain location or the end frequency-domain location or the narrowband that are indicated in the second message, a transmission mode indicated in the first message and a third resource independently determined by the first terminal, a target resource used when the signal is transmitted by using the transmission mode in the first message, and the target resource belongs to the resource pool. The first terminal determines that a frequency domain range of the target resource used when the signal is transmitted starts from the start frequency-domain location or ends at the end frequency-domain location, and a frequency domain width of the target resource used is a maximum frequency domain width indicated in a transmission mode (when the transmission mode is any transmission mode in the foregoing first aspect or any transmission mode in the second aspect). Alternatively, the first terminal determines that a frequency domain range of the target resource used when the signal is transmitted is a frequency domain range in which the indicated narrowband is located. Optionally, the first terminal determines, based on the maximum frequency domain width indicated in the transmission mode, a frequency domain width of each narrowband when narrowband division is performed.

A specific example is used for description, where the example is similar to that in the fifth indication manner, and a difference is that in this example, the first terminal independently determines three third resources. For a manner in which the first terminal determines the target resource, refer to the example in the fifth indication manner. Details are not described herein.

In a seventh indication manner, the network device sends third indication information, fifth indication information, and sixth indication information to the first terminal by using the second message. Compared to the third indication manner, in the seventh indication manner, the sixth indication information is added.

The third indication information is used to indicate a resource pool, the fifth indication information is used to indicate a transmission mode, and the sixth indication information is used to indicate a start frequency-domain location or an end frequency-domain location of a resource that may be used when a signal is transmitted, or indicate a narrowband that may be used when the signal is transmitted. The third indication information may indicate the resource pool by using a frequency domain index and a time domain index. When the sixth indication information is used to indicate a narrowband, the sixth indication information may indicate, by using a narrowband index, the narrowband that may be used when the signal is transmitted. The start frequency-domain location or the end frequency-domain location or the narrowband, the resource pool, and the transmission mode are used by the first terminal to determine a target resource for transmitting the signal.

Herein the third indication information, the fifth indication information and the sixth indication information may be included in a same second message, or may be separately included in a plurality of second messages.

In a specific embodiment, the fourth indication information may be implemented as an SL-TF-IndexPair field or IE, the fifth indication information may be implemented as a transmissionType field, and the sixth indication information may be implemented as a lowest-PRB-index field. For details, refer to related descriptions in the third indication manner and the fifth indication manner.

After receiving the second message, the first terminal may determine, based on the resource pool, the transmission mode, the start frequency-domain location or the end frequency-domain location or the narrowband that are indicated in the second message, and a third resource independently determined by the first terminal, a target resource used when the signal is transmitted by using the transmission mode in the second message, and the target resource belongs to the resource pool. The first terminal determines that a frequency domain range of the target resource used when the signal is transmitted starts from the start frequency-domain location or ends at the end frequency-domain location, and a frequency domain width of the target resource used is a maximum frequency domain width indicated in a transmission mode (when the transmission mode is any transmission mode in the foregoing first aspect or any transmission mode in the second aspect). Alternatively, the first terminal determines that a frequency domain range of the target resource used when the signal is transmitted is a frequency domain range in which the indicated narrowband is located. Optionally, the first terminal determines, based on the maximum frequency domain width indicated in the transmission mode, a frequency domain width of each narrowband. The first terminal determines, based on the frequency domain width of each narrowband and the indicated narrowband index, a frequency domain range in which the indicated narrowband is located.

A specific example is used for description, where the example is similar to that in the fifth indication manner, and a difference is that in this example, the transmission mode is indicated in the second message and the first terminal independently determines three third resources. For a manner in which the first terminal determines the target resource, refer to the example in the fifth indication manner. Details are not described herein.

In an eighth transmission mode, the network device sends third indication information, fourth indication information, fifth indication information and sixth indication information to the first terminal by using the second message. Compared to the fourth transmission mode, in the eighth transmission mode, the sixth indication information is added.

The third indication information is used to indicate a resource pool, the fourth indication information is used to indicate a third resource, the fifth indication information is used to indicate a transmission mode, and the sixth indication information is used to indicate a start frequency-domain location or an end frequency-domain location of a resource that may be used when the signal is transmitted, or indicate a narrowband that may be used when the signal is transmitted. The third indication information may indicate the resource pool by using a frequency domain index and a time domain index, and the fourth indication information may indicate the third resource also by using a frequency domain index and a time domain index. When the sixth indication information is used to indicate a narrowband, the sixth indication information may indicate, by using a narrowband index, the narrowband that may be used when a signal is transmitted. The start frequency-domain location or the end frequency-domain location or the narrowband, the resource pool, the third resource and the transmission mode are used by the first terminal to determine a target resource for transmitting the signal.

Herein the third indication information, the fourth indication information, the fifth indication information, and the sixth indication information may be included in a same second message, or may be separately included in a plurality of second messages.

In a specific embodiment, the third indication information may be implemented as an SL-TF-ResourceConfig field or IE, the fourth indication information may be implemented as an SL-TF-IndexPair field or IE, the fifth indication information may be implemented as a transmissionType field, and the sixth indication information may be implemented as a lowest-PRB-index field. For details, refer to related descriptions in the fourth indication manner and the fifth indication manner.

After receiving the second message, the first terminal may determine, based on the resource pool, the transmission mode, the third resource, and the start frequency-domain location or the end frequency-domain location or the narrowband that are indicated in the second message, a target resource used when the signal is transmitted by using the transmission mode in the second message, and the target resource belongs to the resource pool. The first terminal determines that a frequency domain range of the target resource used when the signal is transmitted starts from the start frequency-domain location or ends at the end frequency-domain location, and a frequency domain width of the target resource used is a maximum frequency domain width indicated in a transmission mode (when the transmission mode is any transmission mode in the foregoing first aspect or any transmission mode in the second aspect). Alternatively, the first terminal determines that a frequency domain range of the target resource used when the signal is transmitted is a frequency domain range in which the indicated narrowband is located. Optionally, the first terminal determines, based on the maximum frequency domain width indicated in the transmission mode, a frequency domain width of each narrowband when narrowband division is performed. The first terminal determines, based on the frequency domain width of each narrowband and the indicated narrowband index, a frequency domain range in which the indicated narrowband is located.

A specific example is used for description, where the example is similar to that in the fifth indication manner, and a difference is that in this example, the transmission mode is indicated in the second message. For a manner in which the first terminal determines the target resource, refer to the example in the fifth indication manner. Details are not described herein.

In a ninth indication manner, the network device sends fourth indication information, fifth indication information, and sixth indication information to the first terminal by using the second message.

The fourth indication information is used to indicate a third resource, the fifth indication information is used to indicate a transmission mode, and the sixth indication information is used to indicate a start frequency-domain location or an end frequency-domain location of a resource that may be used when a signal is transmitted, or indicate a narrowband that may be used when the signal is transmitted. The fourth indication information may indicate the third resource by using a frequency domain index and a time domain index. When the sixth indication information is used to indicate a narrowband, the sixth indication information may indicate, by using a narrowband index, the narrowband that may be used when the signal is transmitted. The start frequency-domain location or the end frequency-domain location or the narrowband, the third resource and the transmission mode are used by the first terminal to determine a target resource for transmitting the signal.

In a specific embodiment, the fourth indication information may be implemented as an SL-TF-IndexPair field or IE. Refer to the foregoing related descriptions, and details are not described herein.

In a specific embodiment, the second message may include an SL-TF-ResourceConfig field or IE, the fifth indication information may be implemented as a transmissionType field in the SL-TF-ResourceConfig field or IE, and the sixth indication information may be implemented as a narrowband-Index field in the SL-TF-ResourceConfig field or IE, where the narrowband-Index field is used to indicate the narrowband index. Optionally, the narrowband-Index field may be replaced with lowest-PRB-index, where the lowest-PRB-index is used to indicate a PRB start index. Details are as follows:

```
SL-TF-ResourceConfig ::=    SEQUENCE{
    transmissionType                ENUMERATED {6 PRB, 1 PRB }
    narrowband-Index    INTEGER (0... 99),
    offsetIndicator-r12             SL-OffsetIndicator-r12,
    subframeBitmap-r12              SubframeBitmapSL-r12
}
```

A time-domain location of the resource that may be used when the first terminal transmits the signal is jointly indicated by using an SL-OffsetIndicator field and a SubframeBitmapSL field.

After receiving the second message, the first terminal may determine, based on the third resource, the transmission mode, and the start frequency-domain location or the end frequency-domain location of a resource that may be used, or the narrowband that may be used when the signal is transmitted that are indicated in the second message, a target resource used when the signal is transmitted by using the transmission mode in the second message, and the target resource belongs to the resource pool. The first terminal determines that a frequency domain range of the target resource used when the signal is transmitted starts from the start frequency-domain location or ends at the end frequency-domain location, and a frequency domain width of the target resource used is a maximum frequency domain width indicated in a transmission mode (when the transmission mode is any transmission mode in the foregoing first aspect or any transmission mode in the second aspect). Alternatively, the first terminal determines that a frequency domain range of the target resource used when the signal is transmitted is a frequency domain range in which the indicated narrowband is located. Optionally, the first terminal determines, based on the maximum frequency domain width indicated in the transmission mode, a frequency domain width of each narrowband when narrowband division is performed. The first terminal determines, based on the frequency domain width of each narrowband and the indicated narrowband index, a frequency domain range in which the indicated narrowband is located.

A specific example is used for description. It is assumed that the second message indicates a transmission mode, namely, a manner of transmitting the signal by using a resource within a 6-PRB frequency domain width. The second message further indicates a start frequency-domain location and a frequency domain index is 0. The second message further indicates a third resource, and the frequency domain index is 2.

After receiving the second message, the first terminal determines, based on the transmission mode (the manner of transmitting a signal by using a resource within a 6-PRB frequency domain width) and the start frequency-domain location (the frequency domain index is 0), a frequency-domain location of a configured resource pool, that is, frequency-domain indexes of the resource pool range from 0 to 5.

The first terminal determines, based on the determined resource pool, the transmission mode and the third resource, target resources: resources whose frequency domain indexes are 2 and 3 (used for transmission for a first time), resources whose frequency domain indexes are 4 and 5 (used for transmission for a second time), resources whose frequency domain indexes are 0 and 1 (used for transmission for a third time), and so on.

It may be understood that the foregoing description is merely an example. In a specific implementation, determining of the target resources by the first terminal may be implemented in more manners.

In a tenth indication manner, the network device sends the fifth indication information and the sixth indication information to the first terminal by using the second message.

The fifth indication information is used to indicate a transmission mode, and the sixth indication information is used to indicate a start frequency-domain location or an end frequency-domain location of a resource that may be used when a signal is transmitted, or indicate a narrowband that may be used when the signal is transmitted. When the sixth indication information is used to indicate a narrowband, the sixth indication information may indicate, by using a narrowband index, the narrowband that may be used when the signal is transmitted. The start frequency-domain location or the end frequency-domain location or the narrowband, and the transmission mode are used by the first terminal to determine a target resource for transmitting the signal.

In a specific embodiment, the second message may include an SL-TF-ResourceConfig field or IE, the fifth indication information may be implemented as a transmissionType field in the SL-TF-ResourceConfig field or IE, and the sixth indication information may be implemented as a narrowband-Index field in the SL-TF-ResourceConfig field or IE, where the narrowband-Index field is used to indicate the narrowband index. Optionally, the narrowband-Index field may be replaced with lowest-PRB-index, where the lowest-PRB-index is used to indicate a PRB start index. For details, refer to related descriptions in the ninth indication manner. Details are not described herein.

After receiving the second message, the first terminal may determine, based on the transmission mode, the start frequency-domain location or the end frequency-domain location of a resource that may be used, or the narrowband that may be used when a signal is transmitted that are indicated in the second message, and a third resource independently determined by the first terminal, a target resource used when the signal is transmitted by using the transmission mode in the second message, and the target resource belongs to the resource pool. The first terminal determines that a frequency domain range of the target resource used when the signal is transmitted starts from the start frequency-domain location or ends at the end frequency-domain location, and a frequency domain width of the target resource used is a maximum frequency domain width indicated in a transmission mode (when the transmission mode is any transmission mode in the foregoing first aspect or any transmission mode in the second aspect). Alternatively, the first terminal determines that a frequency domain range of the target resource used when the signal is transmitted is a frequency domain range in which the indicated narrowband is located. Optionally, the first terminal determines, based on the maximum frequency domain width indicated in the transmission mode, a frequency domain width of each narrowband when narrowband division is performed. The first terminal determines, based on the frequency domain width of each narrowband and the indicated narrowband index, a frequency domain range in which the indicated narrowband is located.

A specific example is used for description, where the example is similar to that in the ninth indication manner, and a difference is that in this example, the first terminal independently determines three third resources. For a manner in which the first terminal determines the target resource, refer to the example in the ninth indication manner. Details are not described herein.

In an eleventh indication manner, the network device sends fourth indication information and sixth indication information to the first terminal by using the second message.

The fourth indication information is used to indicate a third resource, and the sixth indication information is used to indicate a start frequency-domain location or an end frequency-domain location of a resource that may be used when a signal is transmitted, or indicate a narrowband that may be used when the signal is transmitted. When the sixth indication information is used to indicate a narrowband, the sixth indication information may indicate, by using a narrowband index, the narrowband that may be used when the signal is transmitted. The start frequency-domain location or the end frequency-domain location or the narrowband, and the third resource are used by the first terminal to determine a target resource for transmitting the signal.

In a specific embodiment, the fourth indication information may be implemented as an SL-TF-IndexPair field or IE, the sixth indication information may be implemented as a narrowband-Index field in the SL-TF-IndexPair field or IE. Refer to the foregoing related descriptions, and details are not described herein.

After receiving the second message, the first terminal may determine, based on the third resource, and the start frequency-domain location or the end frequency-domain location of a resource that may be used or the narrowband that may be used when the signal is transmitted that are indicated in the second message, and a transmission mode indicated in the first message, a target resource used when the signal is transmitted by using the transmission mode in the first message, and the target resource belongs to the resource pool. The first terminal determines that a frequency domain range of the target resource used when the signal is transmitted starts from the start frequency-domain location or ends at the end frequency-domain location, and a frequency domain width of the target resource used is a maximum frequency domain width indicated in a transmission mode (when the transmission mode is any transmission mode in the foregoing first aspect or any transmission mode in the second aspect). Alternatively, the first terminal determines that a frequency domain range of the target resource used when the signal is transmitted is a frequency domain range in which the indicated narrowband is located. Optionally, the first terminal determines, based on the maximum frequency domain width indicated in the transmission mode, a frequency domain width of each narrowband when narrowband division is performed. The first terminal determines, based on the frequency domain width of each narrowband and the indicated narrowband index, a frequency domain range in which the indicated narrowband is located.

A specific example is used for description, where the example is similar to that in the ninth indication manner, and a difference is that in this example, the first terminal uses the transmission mode in the first message to determine the target resource. For a manner in which the first terminal determines the target resource, refer to the example in the ninth indication manner. Details are not described herein.

In a twelfth indication manner, the network device sends sixth indication information to the first terminal by using the second message.

The sixth indication information is used to indicate a start frequency-domain location or an end frequency-domain location of a resource that may be used when a signal is transmitted, or indicate a narrowband that may be used when the signal is transmitted. When the sixth indication information is used to indicate a narrowband, the sixth indication information may indicate, by using a narrowband index, the narrowband that may be used when the signal is transmitted. The start frequency-domain location or the end frequency-domain location or the narrowband is used by the first terminal to determine a target resource for transmitting the signal.

In a specific embodiment, the sixth indication information may be implemented as a narrowband-Index field, and the narrowband-Index field is used to indicate the narrowband index. Refer to the foregoing related descriptions, and details are not described herein.

After receiving the second message, the first terminal may determine, based on the start frequency-domain location or the end frequency-domain location of a resource that may be used or the narrowband that may be used when the signal is transmitted that is indicated in the second message, a transmission mode indicated in the first message, and a third resource independently determined by the first terminal, a target resource used when the signal is transmitted by using the transmission mode in the second message, and the target resource belongs to the resource pool. The first terminal determines that a frequency domain range of the target resource used when the signal is transmitted starts from the start frequency-domain location or ends at the end frequency-domain location, and a frequency domain width of the target resource used is a maximum frequency domain width indicated in a transmission mode (when the transmission mode is any transmission mode in the foregoing first aspect or any transmission mode in the second aspect). Alternatively, the first terminal determines that a frequency domain range of the target resource used when the signal is transmitted is a frequency domain range in which the indicated narrowband is located. Optionally, the first terminal determines, based on the maximum frequency domain width indicated in the transmission mode, a frequency domain width of each narrowband when narrowband division is performed. The first terminal determines, based on the frequency domain width of each narrowband and the indicated narrowband index, a frequency domain range in which the indicated narrowband is located.

A specific example is used for description, where the example is similar to that in the ninth indication manner, and a difference is that in this example, the first terminal independently determines three third resources, and the first terminal uses the transmission mode in the first message to determine the target resource. For a manner in which the first terminal determines the target resource, refer to the example in the ninth indication manner. Details are not described herein.

In the foregoing fifth indication manner, the eighth indication manner, the ninth indication manner, and the eleventh indication information, the network device sends fourth indication information and sixth indication information to the first terminal by using the second message.

In an optional embodiment, when the sixth indication information is used to indicate a narrowband, the fourth indication information may indicate a frequency-domain location of a third resource by using a relative location, indicated in the sixth indication information, of the third resource in the narrowband.

The fourth indication information may be implemented as an SL-TF-IndexPair field or IE as follows:

```
SL-TF-IndexPair ::=      SEQUENCE{
    discSF-Index             INTEGER (1... 200)
    discPRB-IndexInPool      ENUMERATED (0,1,2)
    OPTIONAL
}
```

The discSF-Index field indicates a time-domain location of the third resource, and the discPRB-IndexInPool field indicates a relative frequency-domain location of the third resource in a resource pool configured for the first terminal.

Specifically, it is assumed that a frequency-domain location of the narrowband indicated in the sixth indication information is frequency-domain locations of PRBs whose indexes range from 6 to 11, as shown in FIG. 5. When a value of the discPRB-IndexInPool is 0, the indicated frequency-domain location of the third resource is a location of the first PRB in the narrowband, namely, a frequency-domain location of a PRB whose index is 6. When a value of the discPRB-IndexInPool is 1, the indicated frequency-domain location of the third resource is a location of the third PRB in the narrowband, namely, a frequency-domain location of a PRB whose index is 8. When a value of the discPRB-IndexInPool is 2, the indicated frequency-domain location of the third resource is a location of the fifth PRB in the resource pool, namely, a frequency-domain location of a PRB whose index is 10.

Figure 6:
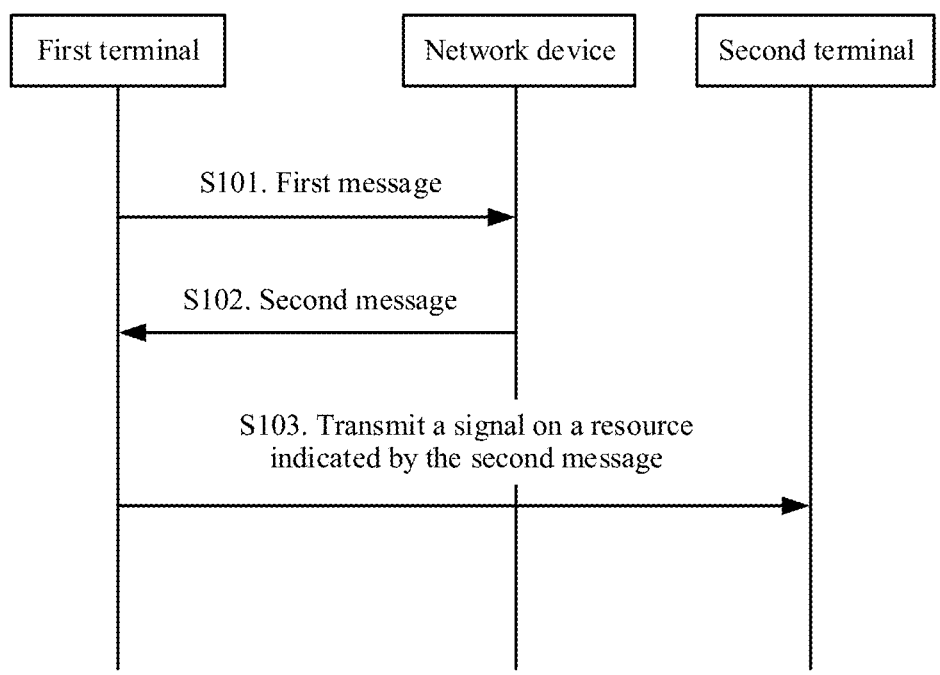
FIG. 6 is a schematic flowchart of a signal transmission method according to this application.

The foregoing describes implementations of functions and signaling of the first message and the second message in detail. Based on the first message and the second message, this application provides a signal transmission method. Referring to FIG. 6, the signal transmission method in this application may include the following steps.

S101. A first terminal sends a first message to a network device, where the first message is used to indicate a transmission mode used by the first terminal to transmit a signal.

S102. Correspondingly, the network device receives the first message sent by the first terminal, and sends a second message to the first terminal, where the second message is used to indicate a resource used by the first terminal to transmit the signal.

S103. Correspondingly, the first terminal receives the second message sent by the network device, and transmits the signal on the resource based on the second message.

Herein, for functions, indication manners and signaling of both the first message and the second message, refer to the foregoing related content. Details are not described herein again.

Figure 7A:
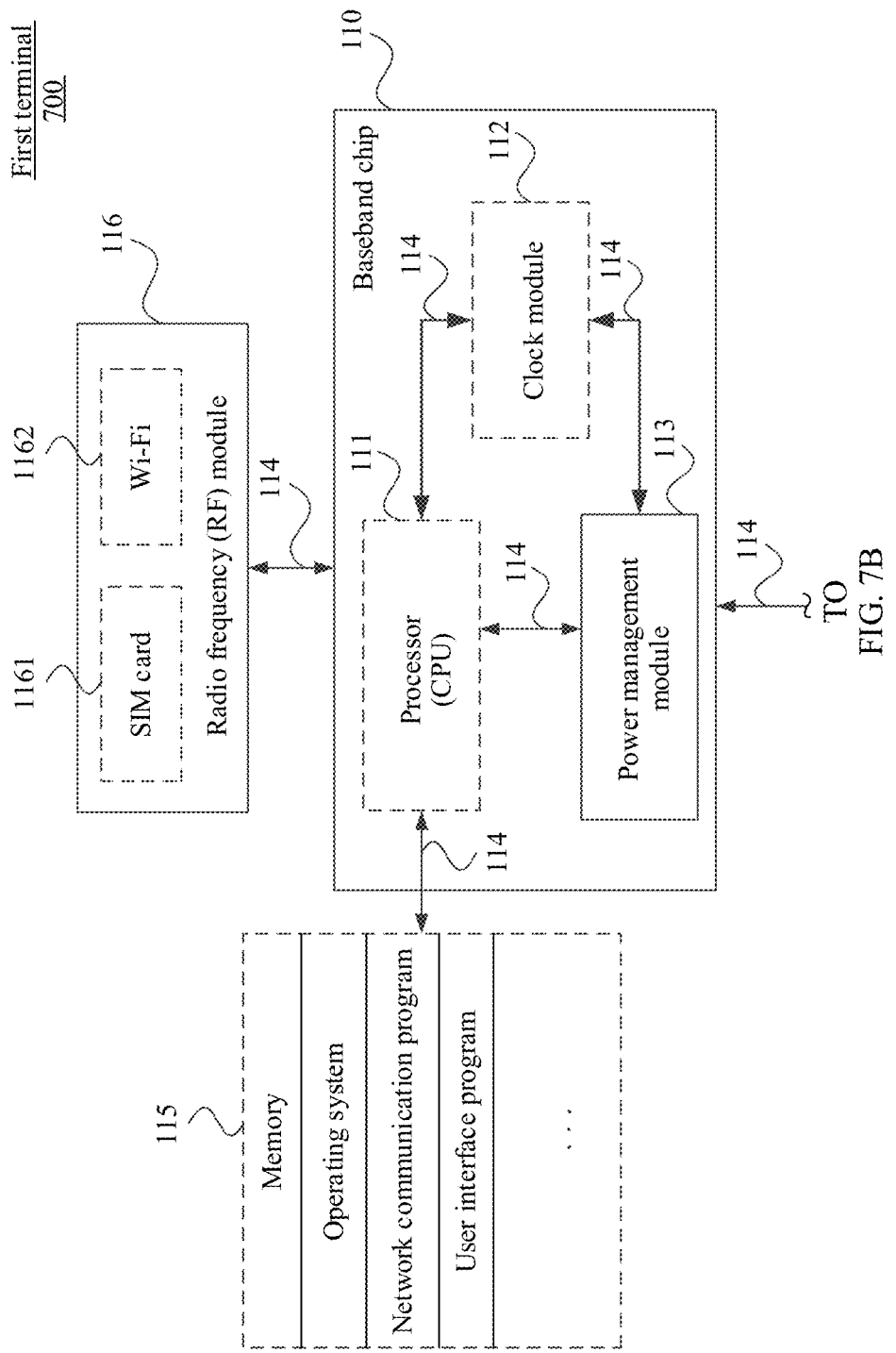
FIG. 7A and FIG. 7B are a schematic diagram of a hardware structure of a first terminal according to this application.
Figure 7B:
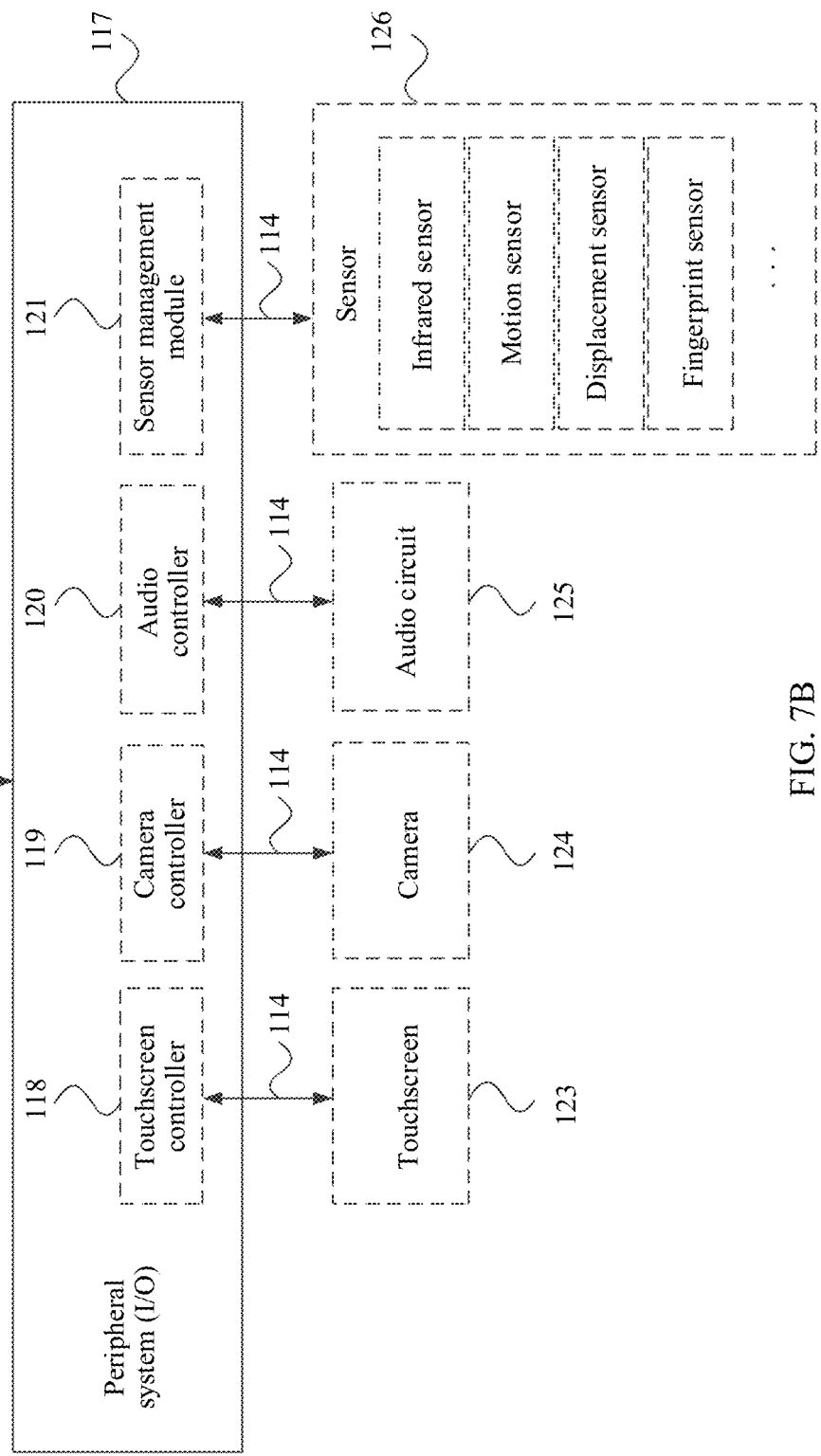

FIG. 7A and FIG. 7B are a schematic diagram of a hardware structure of a first terminal according to this application. As shown in FIG. 7A and FIG. 7B, a first terminal 700 may include a baseband chip 110, a memory 115 (one or more computer-readable storage media), a radio frequency (RF) module 116, and a peripheral system 117. These components may perform communication by using one or more communications buses 114.

The peripheral system 117 is mainly configured to implement a function of interaction between the first terminal 700 and a user/an external environment, and mainly includes an input/output apparatus of the first terminal 700. In a specific implementation, the peripheral system 117 may include a touchscreen controller 118, a camera controller 119, an audio controller 120, and a sensor management module 121. The controllers may be coupled to respective peripheral devices (such as a touchscreen 123, a camera 124, an audio circuit 125, and a sensor 126). It should be noted that the peripheral system 117 may further include another I/O peripheral device.

The baseband chip 110 may integrate one or more processors 111, a clock module 112, and a power management module 113. The clock module 112 integrated into the baseband chip 110 is mainly configured to generate a clock required for data transmission and time sequence control for the processor 111. The power management module 113 integrated into the baseband chip 110 is mainly configured to provide a stable and high-precision voltage for the processor 111, a radio frequency module 116, and the peripheral system.

The radio frequency (RF) module 116 is configured to receive and send a radio frequency signal, and mainly integrates a receiver and a transmitter of the first terminal 700. The radio frequency (RF) module 116 communicates with a network device and another communications device by using the radio frequency signal. In a specific implementation, the radio frequency (RF) module 116 may include but is not limited to, an antenna system, an RF transceiver, one or more amplifiers, a tuner, one or more oscillators, a digital signal processor, a CODEC chip, an SIM card, a WIFI module, a storage medium, and the like. In some embodiments, the radio frequency (RF) module 116 may be implemented on a separate chip. In this application, the radio frequency module 116 may be configured to perform information exchange with the network device.

The memory 115 is coupled to the processor 111, and is configured to store various software programs and/or a plurality of sets of instructions. In a specific implementation, the memory 115 may include a high-speed random access memory, and may alternatively include a non-volatile memory, for example, one or more disk storage devices, a flash memory device, or another non-volatile solid-state storage device. The memory 115 may store an operating system (briefly referred to as a system below) such as an embedded operating system ANDROID, IOS, WINDOWS, or LINUX). The memory 115 may further store a network communication program, and the network communication program may be used to communicate with one or more additional devices, one or more first terminal devices, and one or more network devices. The memory 115 may further store a user interface program, and the user interface program may vividly display content of an application by using a graphical operation interface, and receive a control operation of a user on the application by using input controls such as a menu, a dialog box, and a key.

In a specific implementation, the first terminal 700 may be the first terminal in the communications system shown in FIG. 1, and may be implemented as a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a mobile station in a future 5G network, a first terminal device in a future evolved public land mobile network (PLMN), or the like.

It should be understood that the first terminal 700 is merely an example provided in this application, and the first terminal 700 may have more or fewer components than the shown components, may combine two or more components, or may have different component configurations of components.

Figure 8:
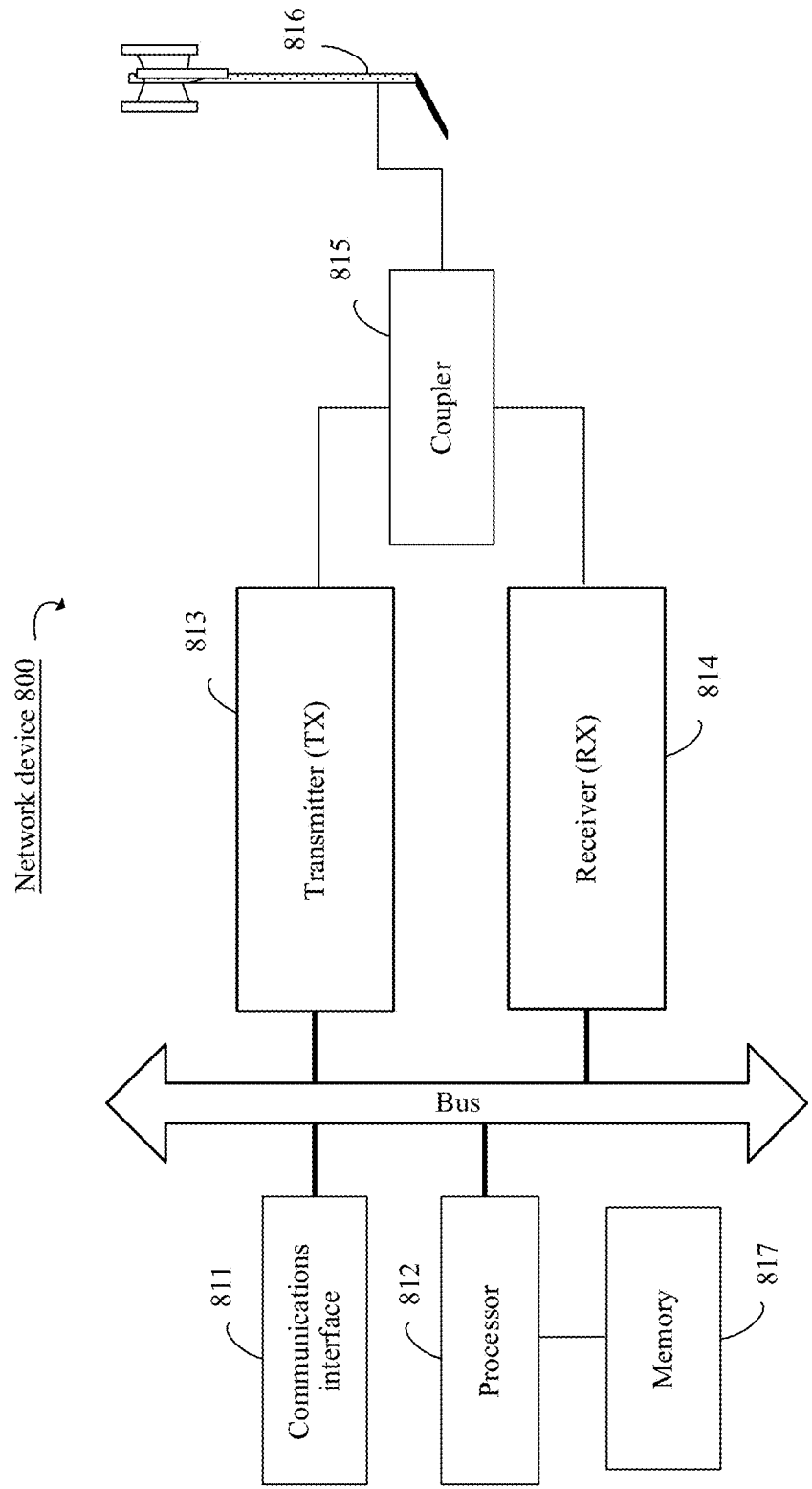
FIG. 8 is a diagram of a hardware structure of a network device according to this application.

FIG. 8 is a structural block diagram of an implementation of a network device 800 according to this application. The network device may include a communications interface 811, one or more processors 812, a transmitter 813, a receiver 814, and a coupler 815, an antenna 816 and a memory 817. These components may be connected by using a bus or in another manner. A bus connection is used as an example in FIG. 8.

The communications interface 811 may be configured for communication between the network device 800 and another communications device, for example, a first terminal or another network device. In a specific implementation, the communications interface 811 may be a network communications interface, for example, an LTE (4G) communications interface, or a communications interface in 5G or future new radio. The communications interface is not limited to a wireless communications interface. The network device 800 may be also configured with a wired communications interface to support wired communication.

The antenna 816 may be configured to convert electromagnetic energy in a transmission line into an electromagnetic wave in free space, or convert an electromagnetic wave in free space into electromagnetic energy in a transmission line. The coupler 815 may be configured to divide a signal into a plurality of signals and allocate the signals to a plurality of receives 814.

The transmitter 813 may be configured to transmit a signal output by the processor 812, and configured to transmit a signal to the first terminal or the another network device. The receiver 814 may be configured to receive a signal received by using the antenna 816, and configured to receive a signal transmitted by the first terminal and the network device. A quantity of both the transmitter 813 and the receiver 814 may be one or more.

In this application, the transmitter 813 is configured to send a second message, and the like, to the first terminal.

The memory 817 is coupled to the processor 812, and is configured to store various software programs and/or a plurality of sets of instructions. In a specific implementation, the memory 812 may include a high-speed random access memory, and may alternatively include a non-volatile memory, for example, one or more disk storage devices, a flash memory device, or another non-volatile solid-state storage device. The memory 812 may store an operating system (briefly referred to as a system below) such as an embedded operating system uCOS, VxWorks, or RTLinux. The memory 812 may further store a network communication program, and the network communication program may be used to communicate with one or more additional devices, one or more first terminal devices, and one or more network devices.

In some embodiments of this application, the memory 812 may be configured to store a program for implementing, on the network device 800 side, the signal transmission method provided in one or more embodiments of this application. For implementation of the signal transmission method provided in one or more embodiments of this application, refer to the foregoing embodiments.

The processor 812 may include an administration module/communications module (AM/CM) (a center configured to switch speech channels and exchange information), a basic module (BM) (configured to implement functions of call processing, signaling processing, radio resource management, radio link management, and circuit maintenance), a transcoder and submultiplexer (TCSM) (configured to complete functions of multiplexing/demultiplexing and code transformation, and the like.

In this application, the processor 812 may be configured to read and execute a computer readable instruction. Specifically, the processor 812 may be configured to invoke the program stored in the memory 817, for example, the program for implementing, on the network device 800, the signal transmission method provided in one or more embodiments of this application, and execute an instruction included in the program.

In a specific implementation, the network device 800 may be the network device in the communications system shown in FIG. 1, and may be implemented as a base transceiver station, a wireless transceiver, a basic service set (BSS), an extended service set (ESS), a NodeB, an eNodeB, or the like. The network device 800 may be implemented as a base station in different types, for example, a macro base station, a micro base station, or the like.

It should be noted that the network device 800 shown in FIG. 8 is merely one implementation in this application. In an actual application, the network device 800 may further include more or fewer components. This is not limited herein.

Figure 9:
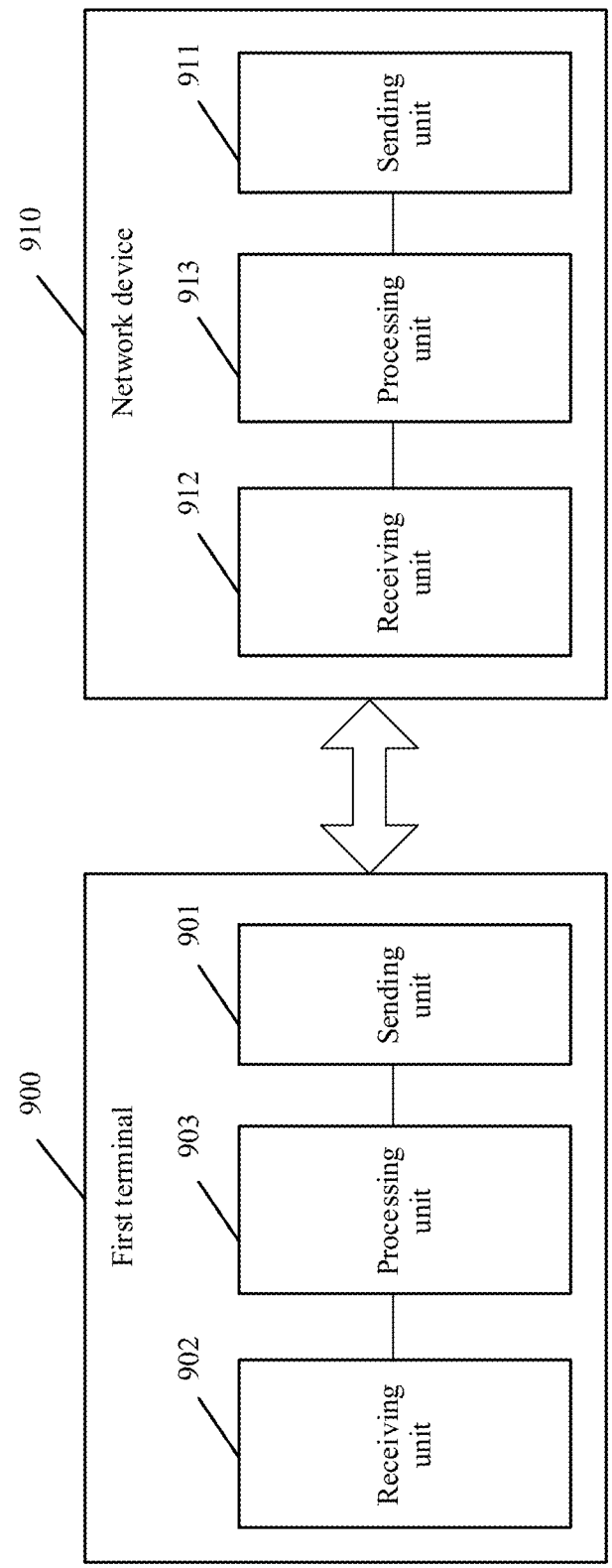
FIG. 9 is a function block diagram of a first terminal and a network device according to this application.

FIG. 9 is a schematic structural diagram of a first terminal 900 and a network device 910 according to this application. The first terminal 900 and the network device 910 may be respectively the first terminal and the network device in the communications system shown in FIG. 1, or may be respectively the first terminal and the network device in the method embodiment shown in FIG. 6.

First, as shown in the figure, the first terminal 900 may include a sending unit 901, a receiving unit 902, and a processing unit 903.

The processing unit 903 is configured to configure a first message, where the first message is used to indicate a transmission mode used by the first terminal to transmit a signal.

The sending unit 901 is configured to send the first message to the network device.

The receiving unit 902 is configured to receive a second message sent by the network device, where the second message is used to indicate a resource used by the first terminal to transmit the signal.

The sending unit 901 is further configured to transmit the signal on the resource.

In an optional embodiment, the first message is further used to indicate a quantity of signals transmitted by using the transmission mode.

In an optional embodiment, the transmission mode of the signal is a manner of using a resource when the first terminal transmits the signal. The transmission mode of the signal may be classified from three aspects. For details, refer to foregoing related description. Details are not described herein.

It may be understood that, for implementation of information and signaling included in the first message and the second message, refer to foregoing related description.

It may be understood that, for specific implementation of each function module included in the first terminal 900 of FIG. 9, refer to the foregoing embodiments. Details are not described herein.

Second, as shown in the figure, the network device 910 may include a sending unit 911, a receiving unit 912, and a processing unit 913.

The receiving unit 912 is configured to receive a first message sent by a first terminal, where the first message is used to indicate a transmission mode used by the first terminal to transmit a signal.

The processing unit 913 is configured to configure a second message, where the second message is used to indicate a resource used by the first terminal to transmit the signal.

The sending unit 911 is configured to send the second message to the first terminal.

In an optional embodiment, the first message is further used to indicate a quantity of signals transmitted by using the transmission mode.

In an optional embodiment, the transmission mode of the signal is a manner of using a resource when the first terminal transmits the signal. The transmission mode of the signal may be classified from three aspects. For details, refer to foregoing related description. Details are not described herein.

It may be understood that, for implementation of information and signaling included in the first message and the second message, refer to foregoing related description.

It may be understood that, for specific implementation of each function module included in the network device 910 of FIG. 9, refer to the foregoing embodiments. Details are not described herein.

In addition, this application further provides a communications system. The communications system may be the communications system shown in FIG. 1, and may include a first terminal and a network device. The first terminal may be the first terminal in the method embodiment shown in FIG. 6, and the network device may be the network device in the method embodiment shown in FIG. 6.

In a specific implementation, the first terminal may be the first terminal shown in the FIG. 7A and FIG. 7B or FIG. 9, and the network device may be the network device shown in FIG. 8 or FIG. 9.

For specific implementations of the first terminal and the network device, refer to the foregoing related content. Details are not described herein again.

In conclusion, in implementation of this application, when requesting, from the network device, the resources used to send the information, the first terminal notifies the network device of the transmission mode of the signal, so that the network device may configure corresponding resources for the first terminal, and the first terminal may determine the target resource from the configured resources and transmit, by using the target resource, the signal in a corresponding transmission mode.

A person of ordinary skill in the art may understand that all or some of the procedures of the methods in the foregoing embodiments may be implemented by a computer program instructing related hardware. The program may be stored in a computer readable storage medium. When the program runs, the procedures of the foregoing method embodiments are performed. The foregoing storage medium includes any medium that can store program code, such as a ROM, a random access memory RAM, a magnetic disk, or an optical disc.

What is claimed is:

1. A method for signal transmission, comprising:
   sending, by a first terminal, a first message to a network device, wherein the first message includes information indicating a transmission mode of the first terminal that the first terminal uses to transmit a signal, and the first message includes information indicating a quantity of signals to be transmitted by using the transmission mode, the transmission mode including a manner of using resources within different maximum frequency domain widths for the first terminal to transmit the signal by indicating at least one of the maximum frequency domain widths;
   receiving a second message sent by the network device, wherein the second message includes information indicating a resource corresponding to at least one of the resources for the first terminal to transmit the signal and information indicating the transmission mode; and
   transmitting the signal on the resource.

2. The method according to claim 1 wherein the at least one of the maximum frequency domain widths comprises any one of one PRB, six PRBs, sidelink bandwidth and a frequency domain width of a resource pool.

3. The method according to claim 1, wherein the manner of using the resources comprises at least one of the following manners:
   a manner of transmitting the signal a plurality of times on different frequency domain resources, wherein a frequency domain width of the frequency domain resource is a maximum frequency domain width supported with a second terminal used to receive the signal receiving a sidelink signal; or
   a manner of transmitting the signal by using a first resource, wherein the first resource is determined by the first terminal based on a second resource occupied by a sidelink signal that is received by the first terminal.

4. The method according to claim 3, wherein with the manner of using the resources comprising the manner of transmitting the signal by using the first resource, the first message further includes information indicating the first resource or the second resource.

5. The method according to claim 1, wherein the transmitting of the signal on the resource comprises:
transmitting the signal based on the transmission mode indicated in the first message; or
transmitting the signal based on the transmission mode indicated in the second message.

6. The method according to claim 5, wherein
the transmitting of the signal based on the transmission mode indicated in the first message includes determining a target resource from the resources based on the transmission mode indicated in the first message and a third resource, and transmitting the signal by using the target resource,
the transmitting of the signal based on the transmission mode indicated in the second message includes determining a target resource from the resources based on the transmission mode indicated in the second message and a third resource, and transmitting the signal by using the target resource, and
the third resource is determined by the first terminal, or is indicated in the second message.

7. A method for signal transmission, comprising:
receiving, by a network device, a first message sent by a first terminal, wherein the first message includes information indicating a transmission mode of the first terminal that the first terminal uses to transmit a signal, and the first message includes information indicating a quantity of signals to be transmitted by using the transmission mode, the transmission mode including a manner of using resources within different maximum frequency domain widths for the first terminal to transmit the signal by indicating at least one of the maximum frequency domain widths; and
sending a second message to the first terminal, wherein the second message includes information indicating a resource corresponding to at least one of the resources for the first terminal to transmit the signal and information indicating the transmission mode.

8. The method according to claim 7, wherein the at least one of the maximum frequency domain widths comprises any one of one PRB, six PRBs, sidelink bandwidth or a frequency domain width of a resource pool.

9. The method according to claim 7, wherein the manner of using the resources comprises at least one of the following manners:
a manner of transmitting the signal a plurality of times on different frequency domain resources, wherein a frequency domain width of the frequency domain resource is a maximum frequency domain width supported with a second terminal used to receive the signal receiving a sidelink signal; or
a manner of transmitting the signal by using a first resource, wherein the first resource is determined by the first terminal based on a second resource occupied by a sidelink signal that is received by the first terminal.

10. The method according to claim 9, wherein with the manner of using the resources comprising the manner of transmitting the signal by using the first resource, the first message further includes information indicating the first resource or the second resource.

11. The method according to claim 7, wherein the second message further includes information indicating a third resource, the third resource and the transmission mode are used by the first terminal to determine a target resource from resources based on the transmission mode indicated in the second message, and the target resource is used to transmit the signal.

* * * * *